US011403230B2

(12) United States Patent
Suganuma et al.

(10) Patent No.: US 11,403,230 B2
(45) Date of Patent: Aug. 2, 2022

(54) INFORMATION PROCESSING DEVICE AND INFORMATION PROCESSING METHOD

(71) Applicant: SONY CORPORATION, Tokyo (JP)

(72) Inventors: Hisahiro Suganuma, Tokyo (JP); Daisuke Fukunaga, Tokyo (JP); Yoshiki Tanaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 64 days.

(21) Appl. No.: 16/763,221

(22) PCT Filed: Aug. 22, 2018

(86) PCT No.: PCT/JP2018/030891
§ 371 (c)(1),
(2) Date: May 11, 2020

(87) PCT Pub. No.: WO2019/097794
PCT Pub. Date: May 23, 2019

(65) Prior Publication Data
US 2020/0334164 A1 Oct. 22, 2020

(30) Foreign Application Priority Data
Nov. 20, 2017 (JP) .............................. JP2017-222787

(51) Int. Cl.
*G06F 12/00* (2006.01)
*G06F 12/0893* (2016.01)
*G06F 3/14* (2006.01)

(52) U.S. Cl.
CPC ............ *G06F 12/0893* (2013.01); *G06F 3/14* (2013.01); *G06F 2212/1041* (2013.01)

(58) Field of Classification Search
CPC . G06F 12/0893; G06F 3/14; G06F 2212/1041
See application file for complete search history.

(56) References Cited

U.S. PATENT DOCUMENTS

2003/0074374 A1 4/2003 Karibe et al.
2015/0331720 A1* 11/2015 Huetter ................. G06F 9/5016
718/104

(Continued)

FOREIGN PATENT DOCUMENTS

CN 1156862 A 8/1997
EP 770964 A1 5/1997

(Continued)

OTHER PUBLICATIONS

International Search Report and Written Opinion of PCT Application No. PCT/JP2018/030891, dated Nov. 27, 2018, 06 pages of ISRWO.

*Primary Examiner* — Gurtej Bansal
(74) *Attorney, Agent, or Firm* — Chip Law Group

(57) ABSTRACT

An information processing device including a receiver that receives a plurality of pieces of control information from another device, and a controller that adds, in order of reception, a plurality of pieces of control information received from another device to a predetermined storage area, and adds, to a first buffer area related to first control information stored in the predetermined storage area, partial data of first input data corresponding to the first control information, in accordance with order of reception of the partial data.

16 Claims, 20 Drawing Sheets

(56) References Cited

U.S. PATENT DOCUMENTS

2017/0177653 A1 6/2017 Goda et al.
2018/0210793 A1* 7/2018 Mamluk ............. G06F 11/2094

FOREIGN PATENT DOCUMENTS

| JP | 10-111761 A | 4/1998 |
| JP | 10-124291 A | 5/1998 |
| JP | 2003-143222 A | 5/2003 |
| JP | 2015-203927 A | 11/2015 |

* cited by examiner

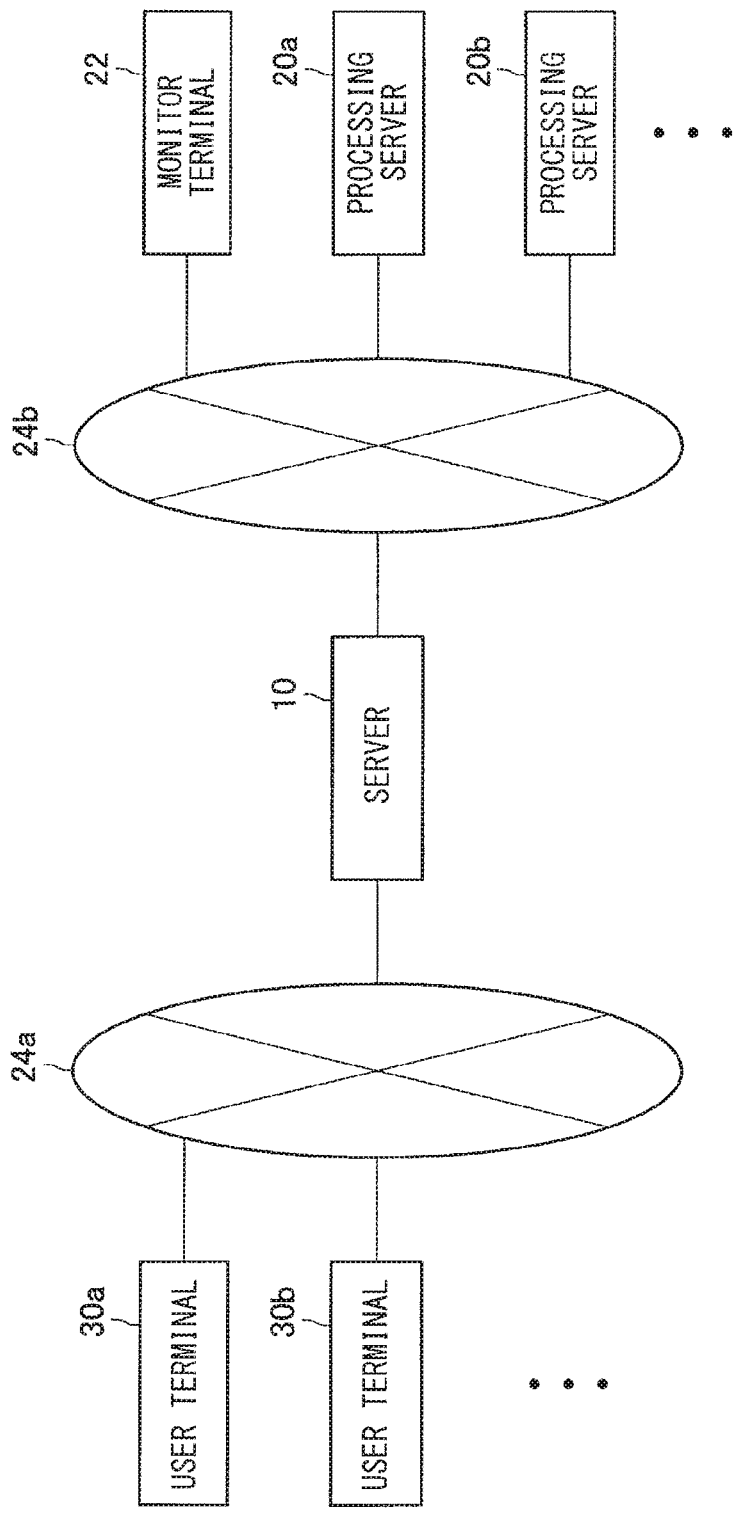
[FIG. 1]

[ FIG. 2 ]
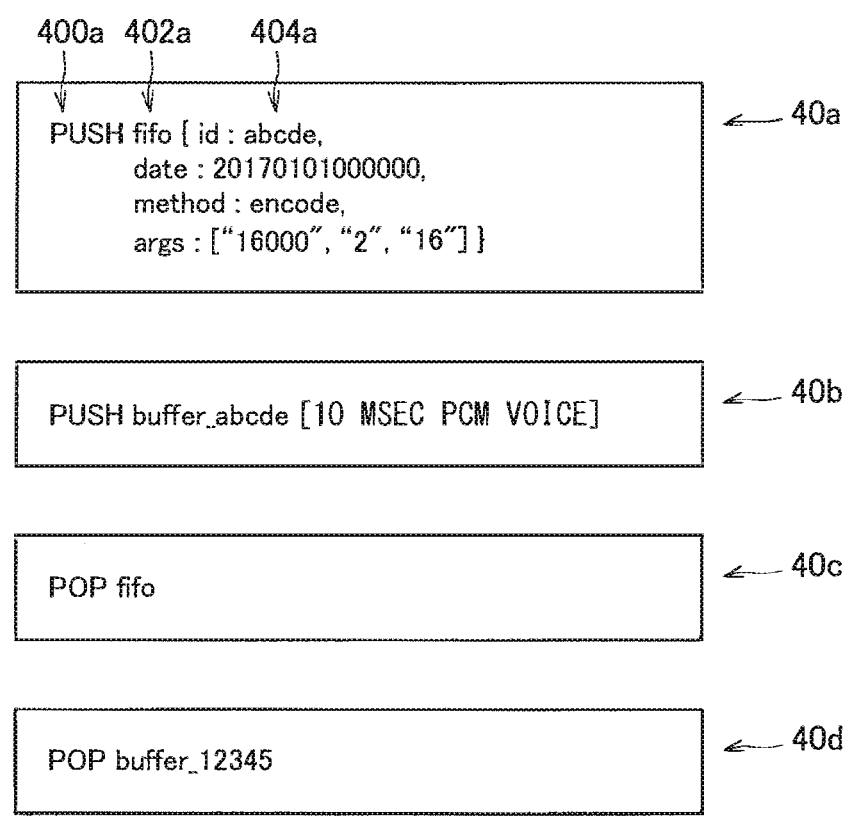

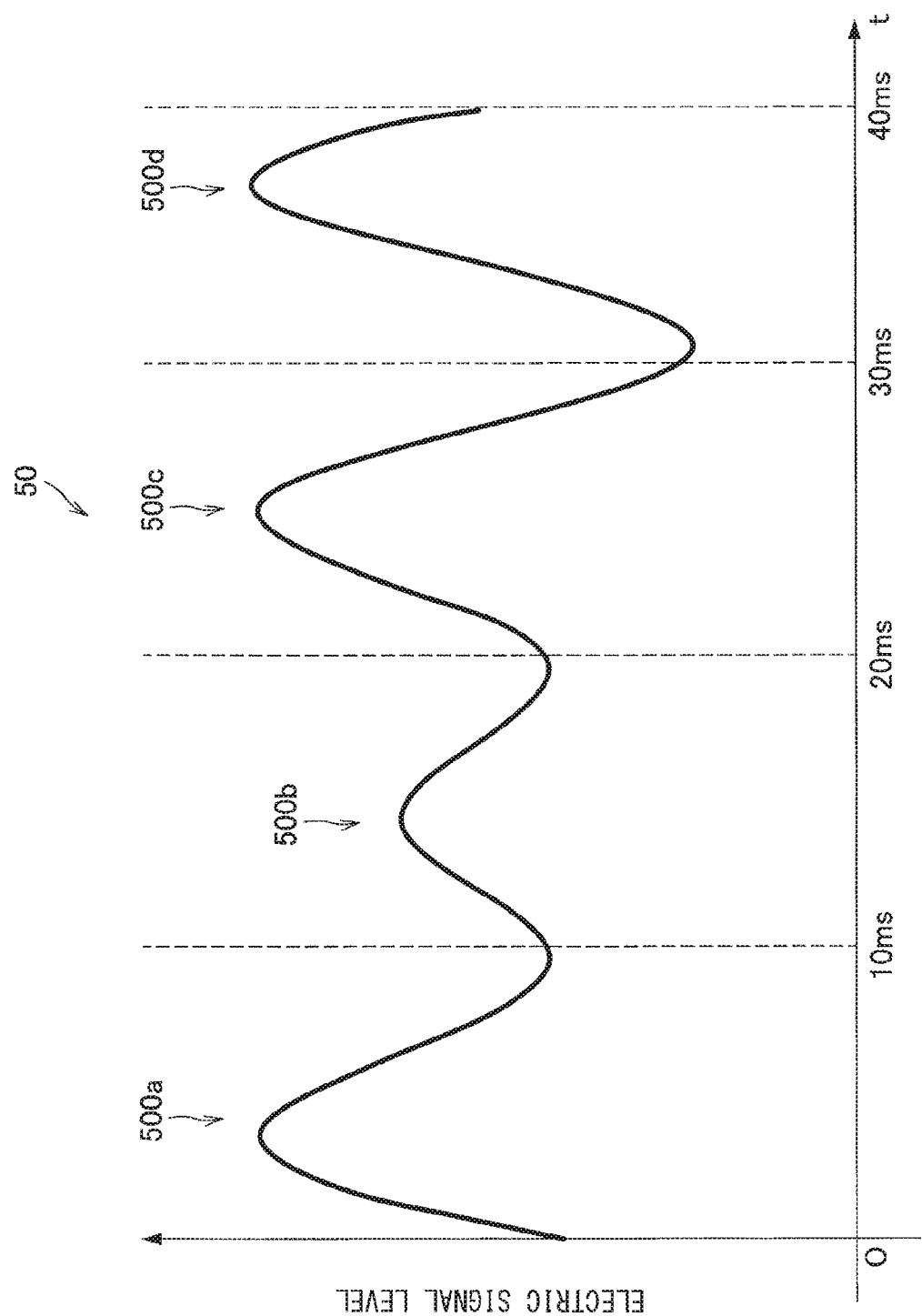
[FIG. 3]

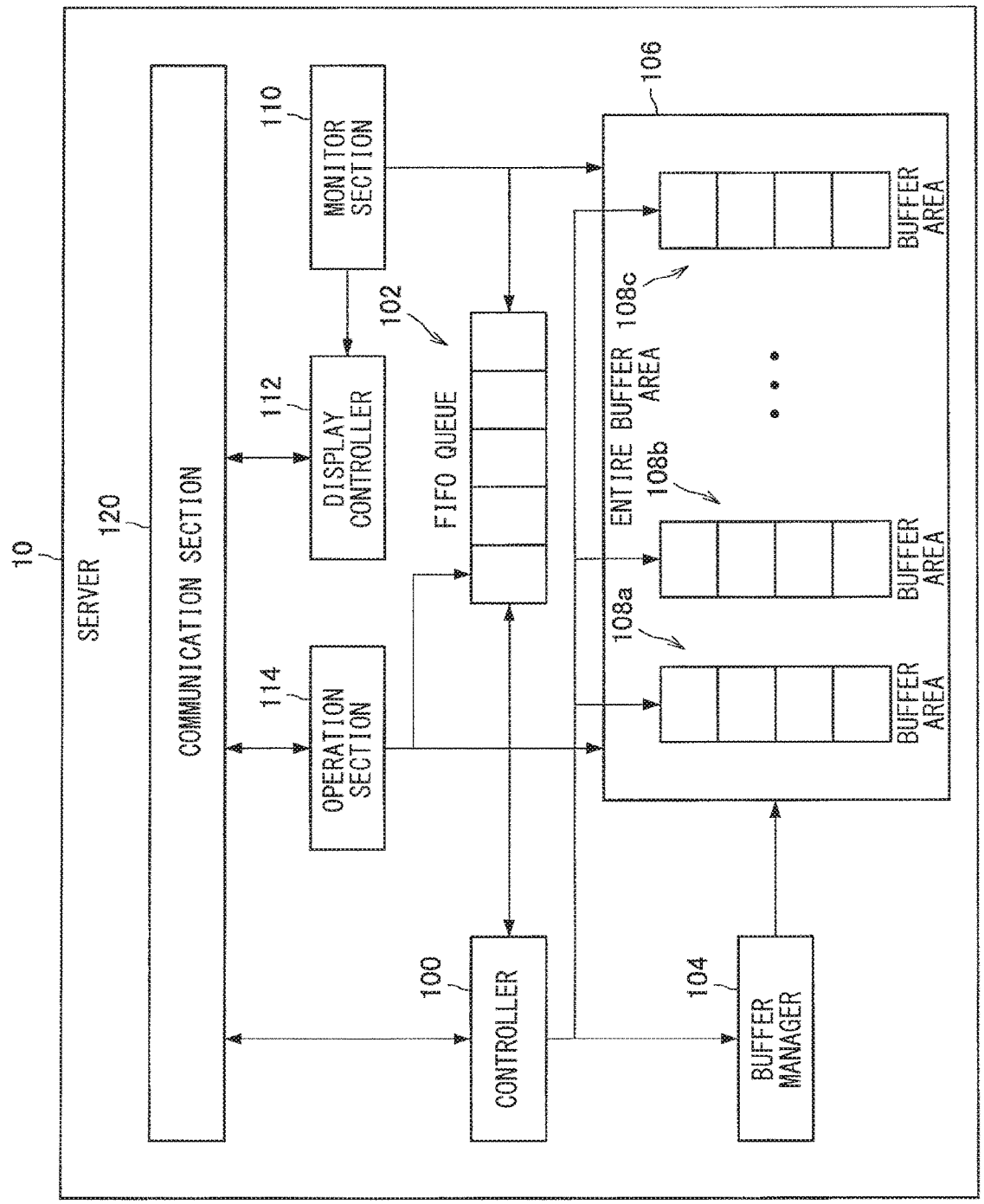
[FIG. 4]

[FIG. 5]
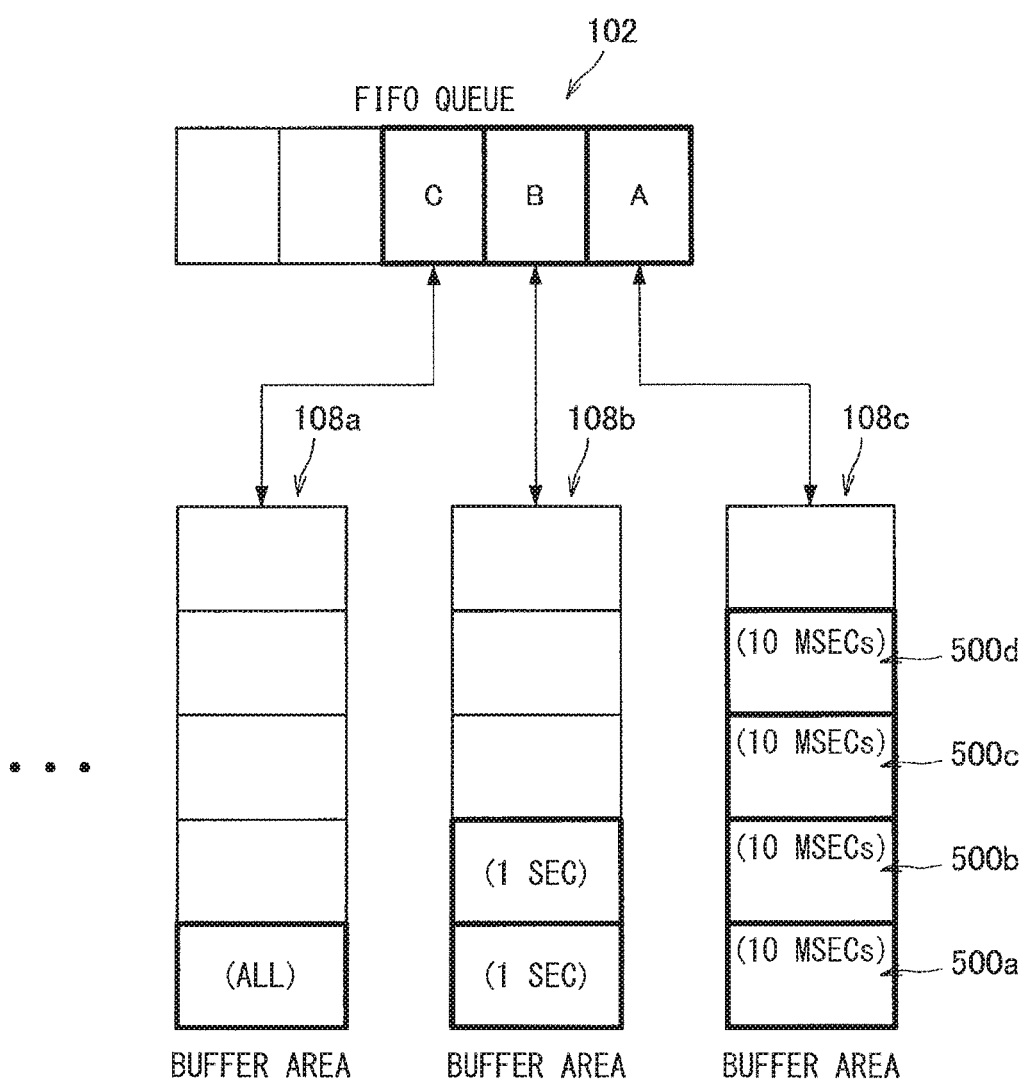

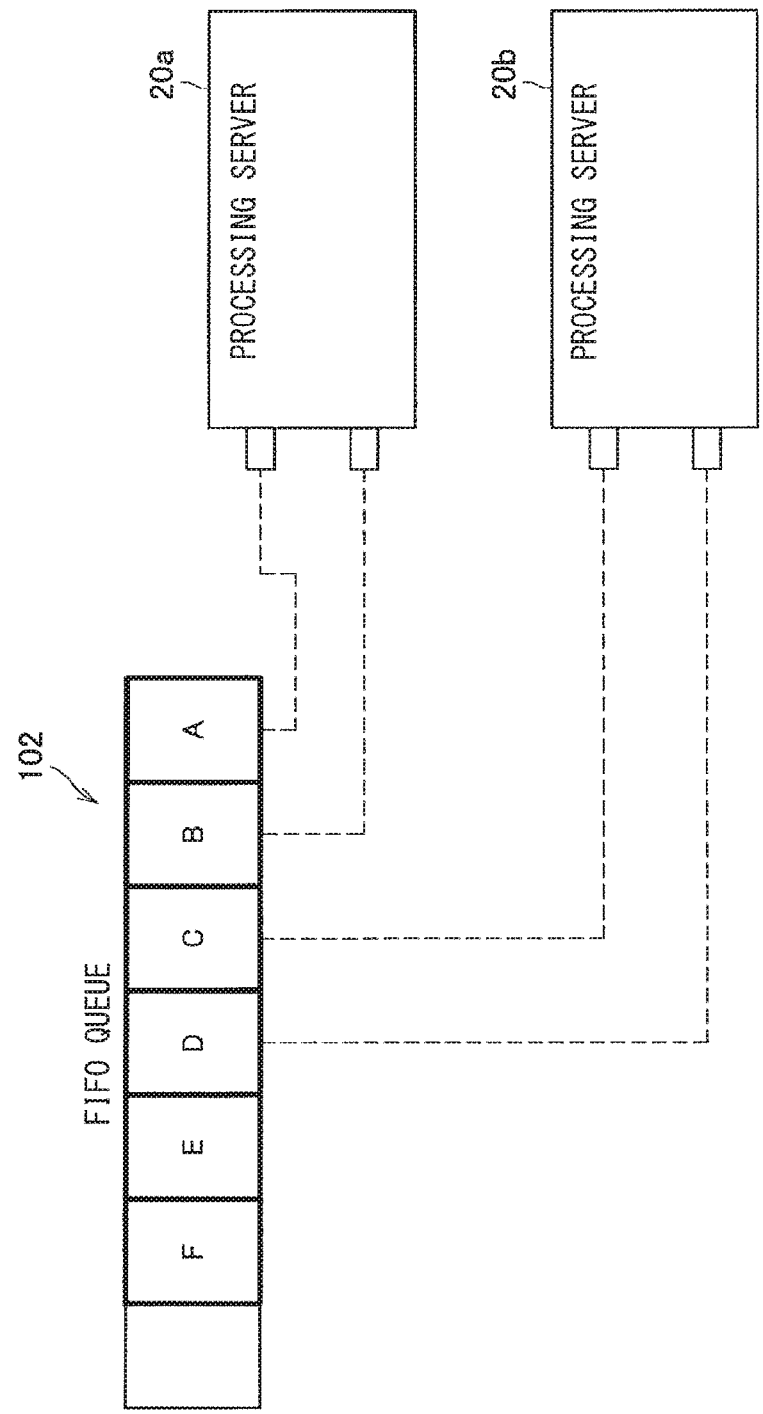
[FIG. 6A]

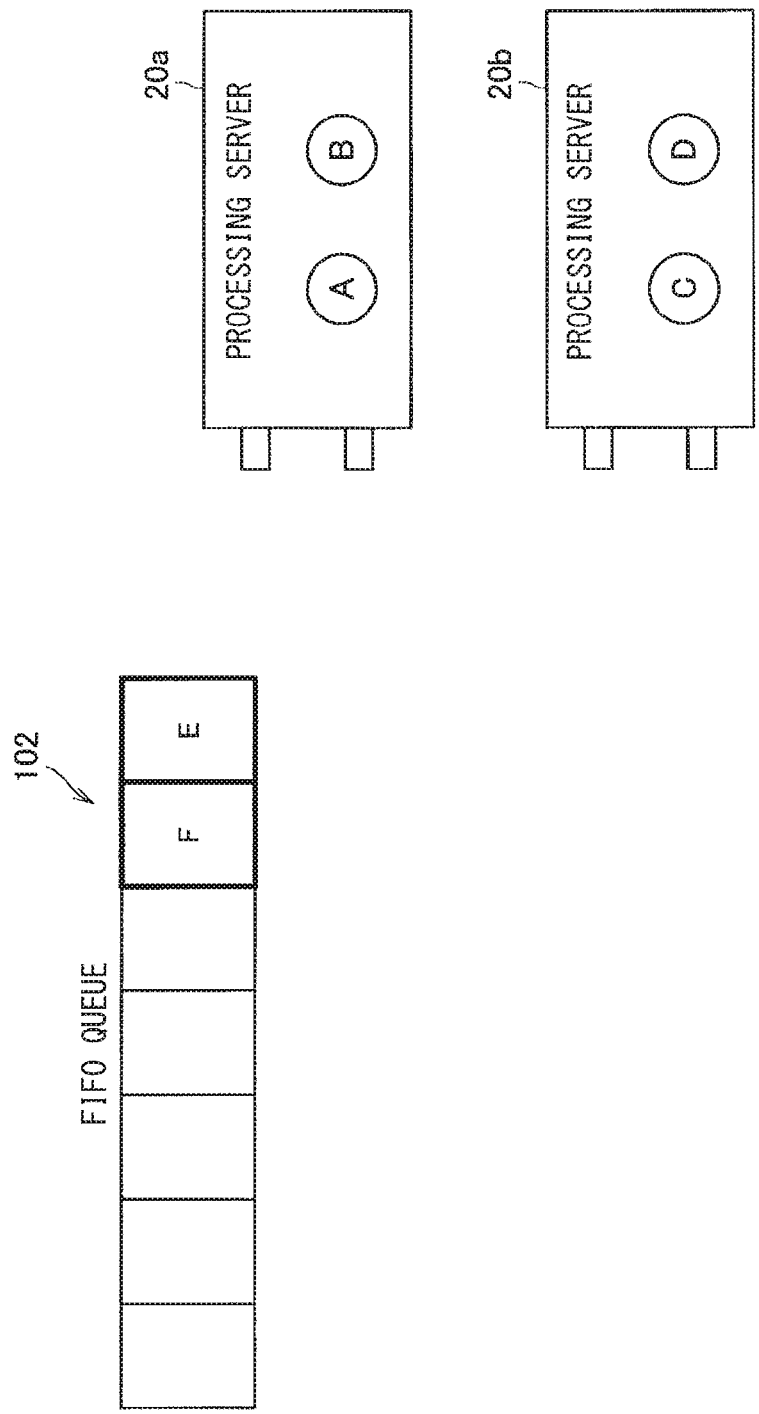
[FIG. 6B]

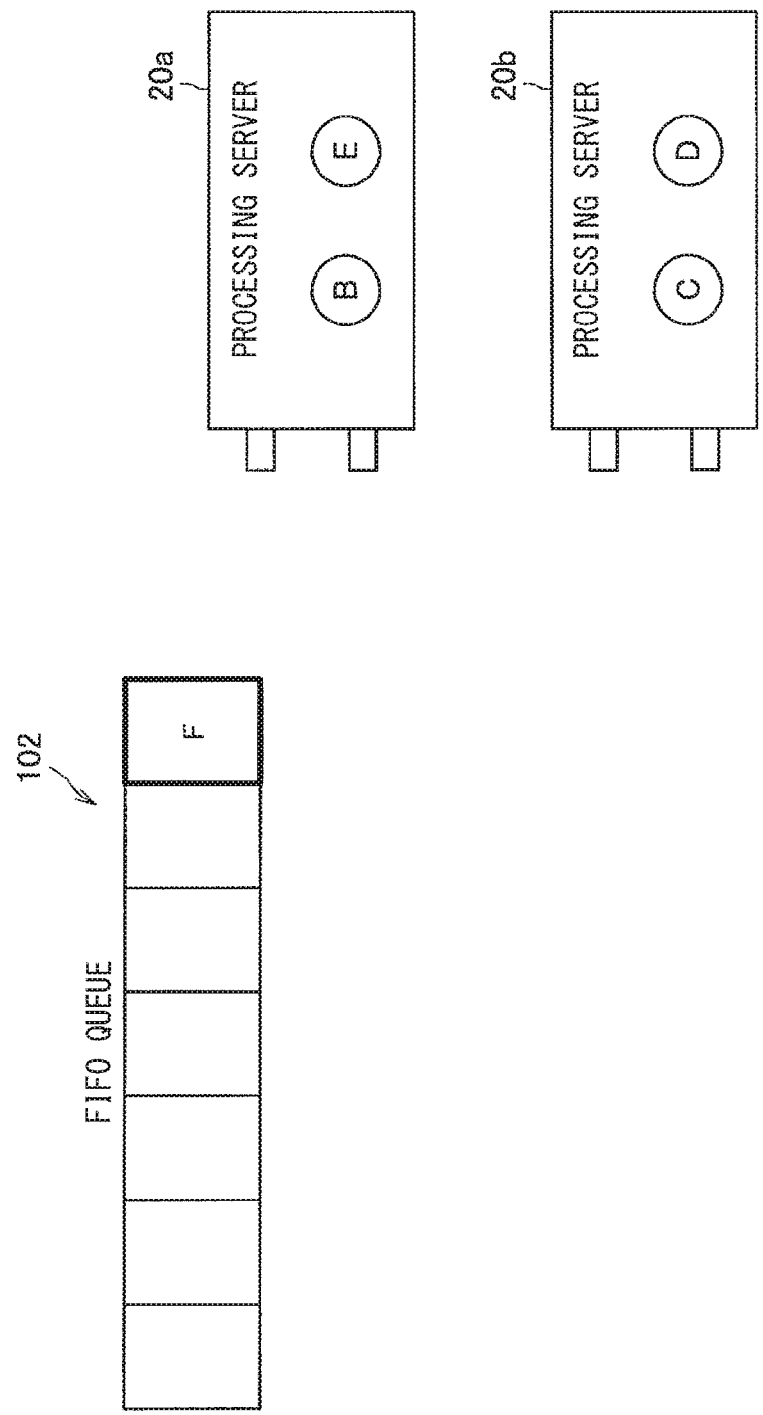

[FIG. 7]
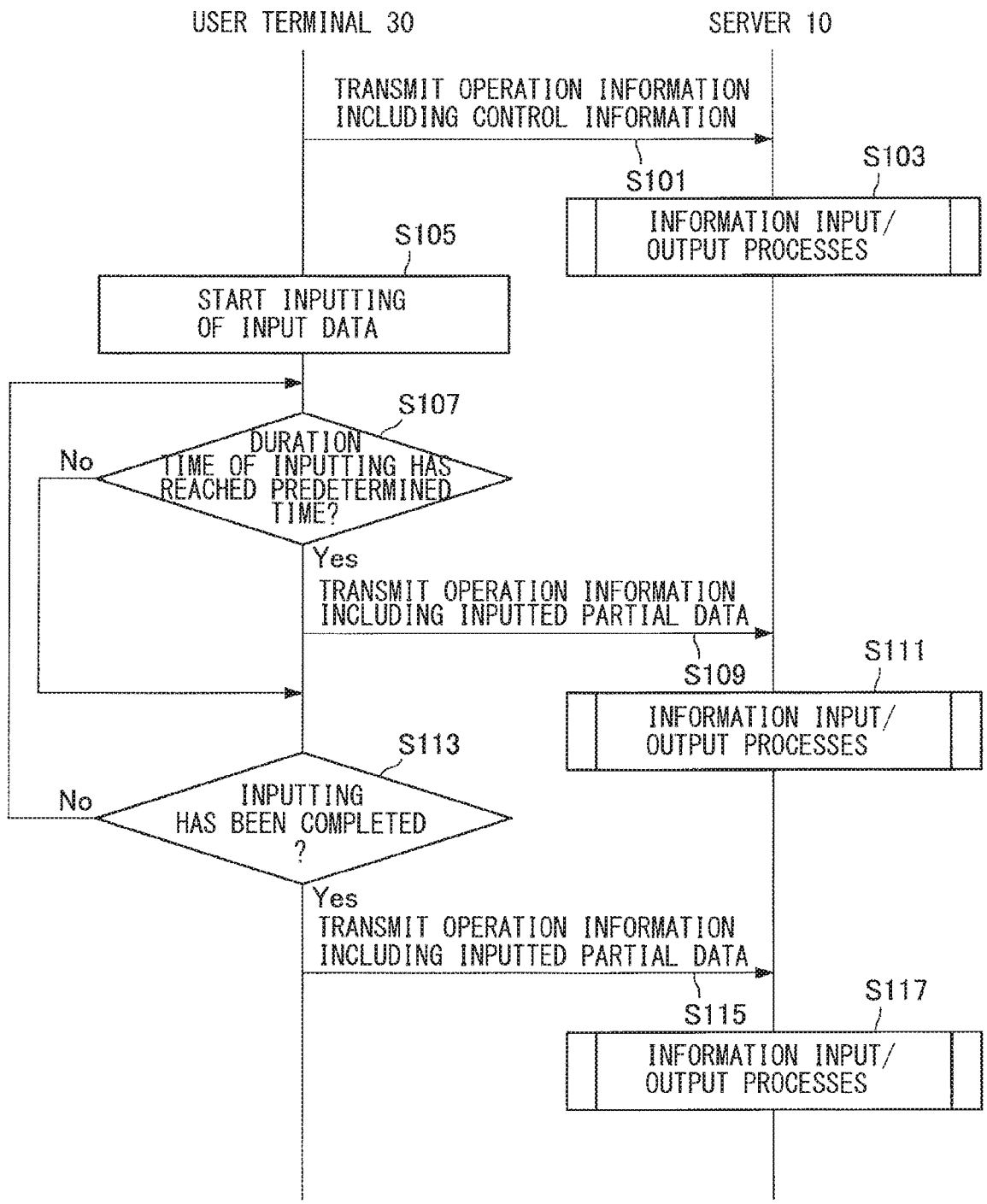

[FIG. 8]
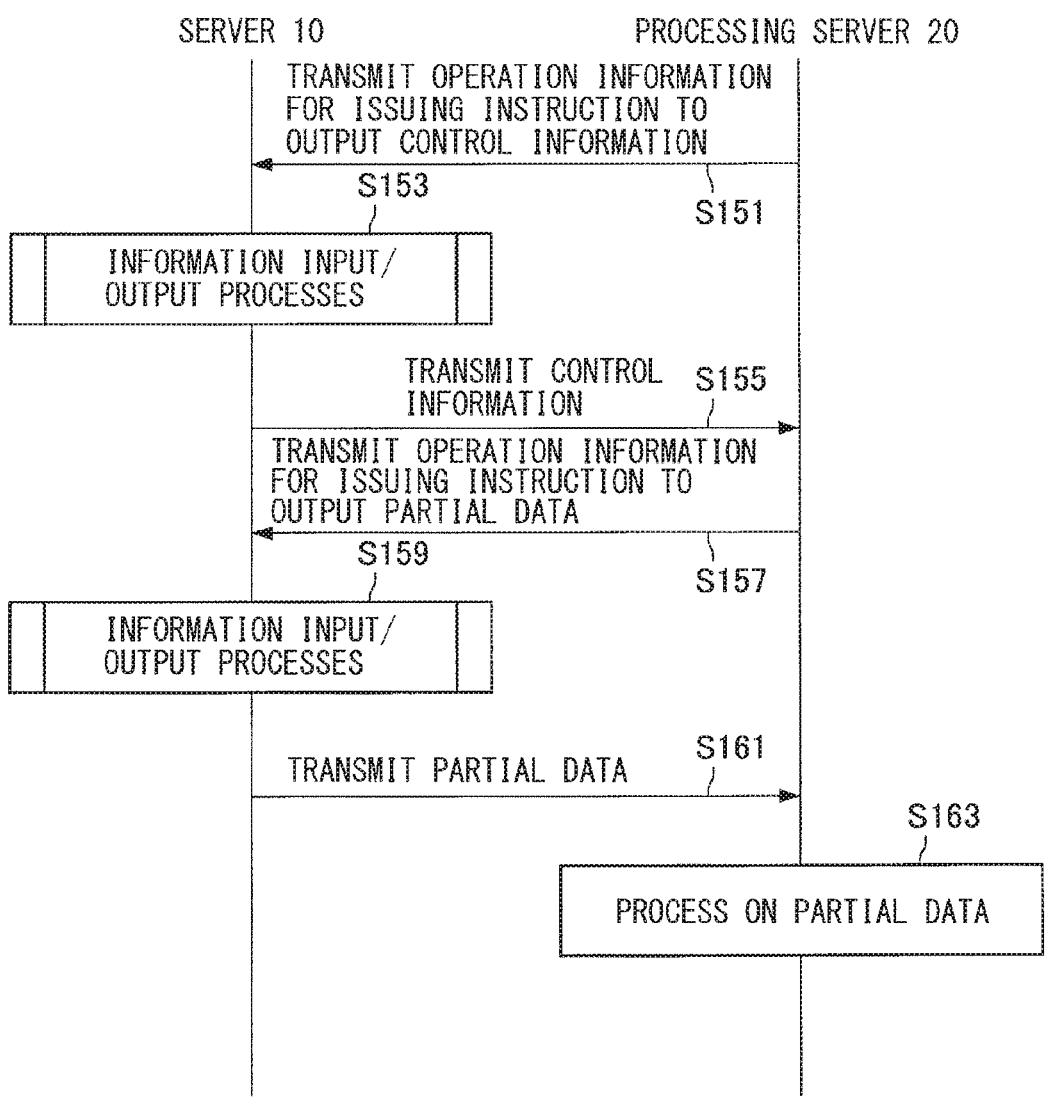

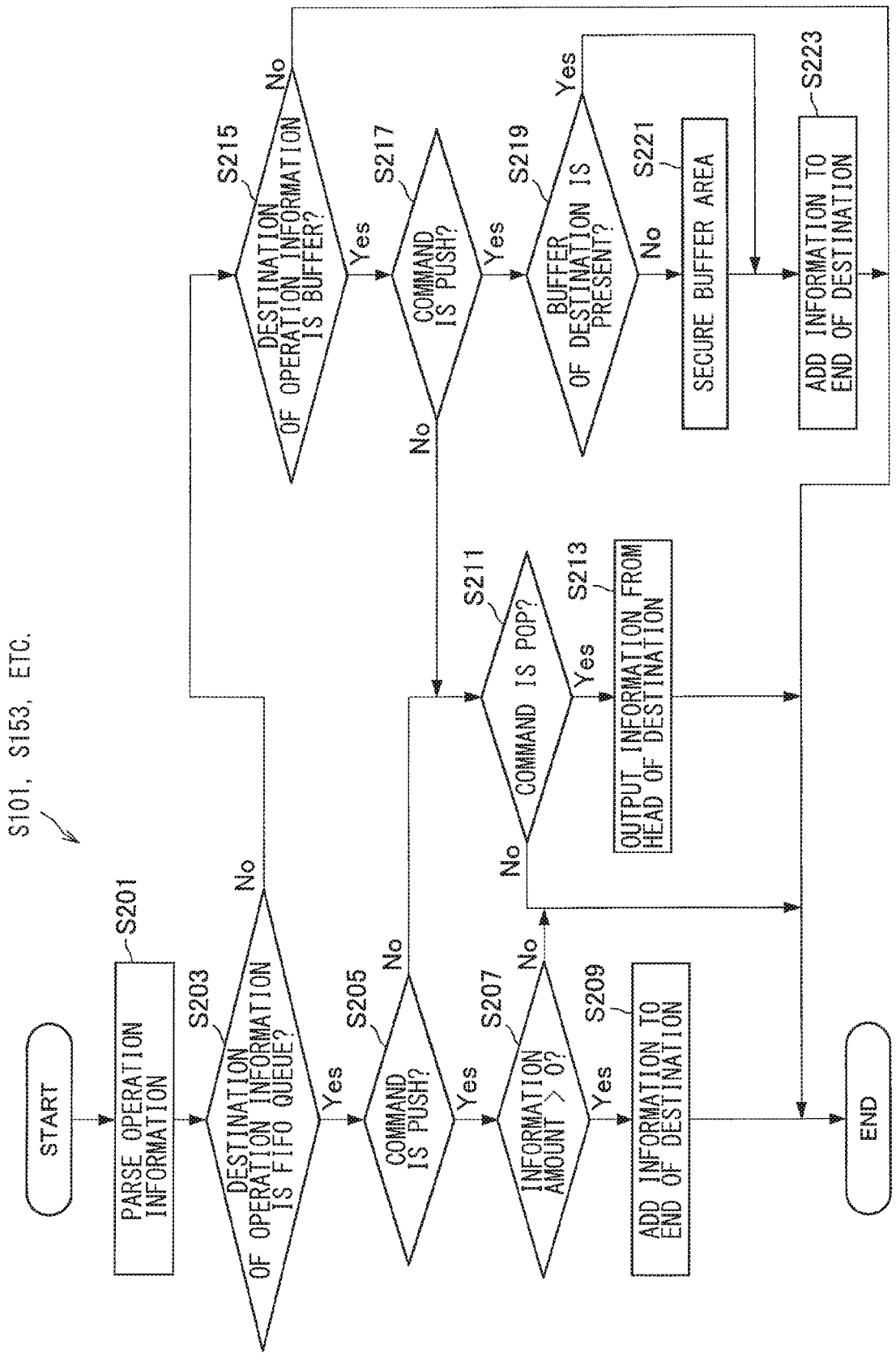
[FIG. 9]

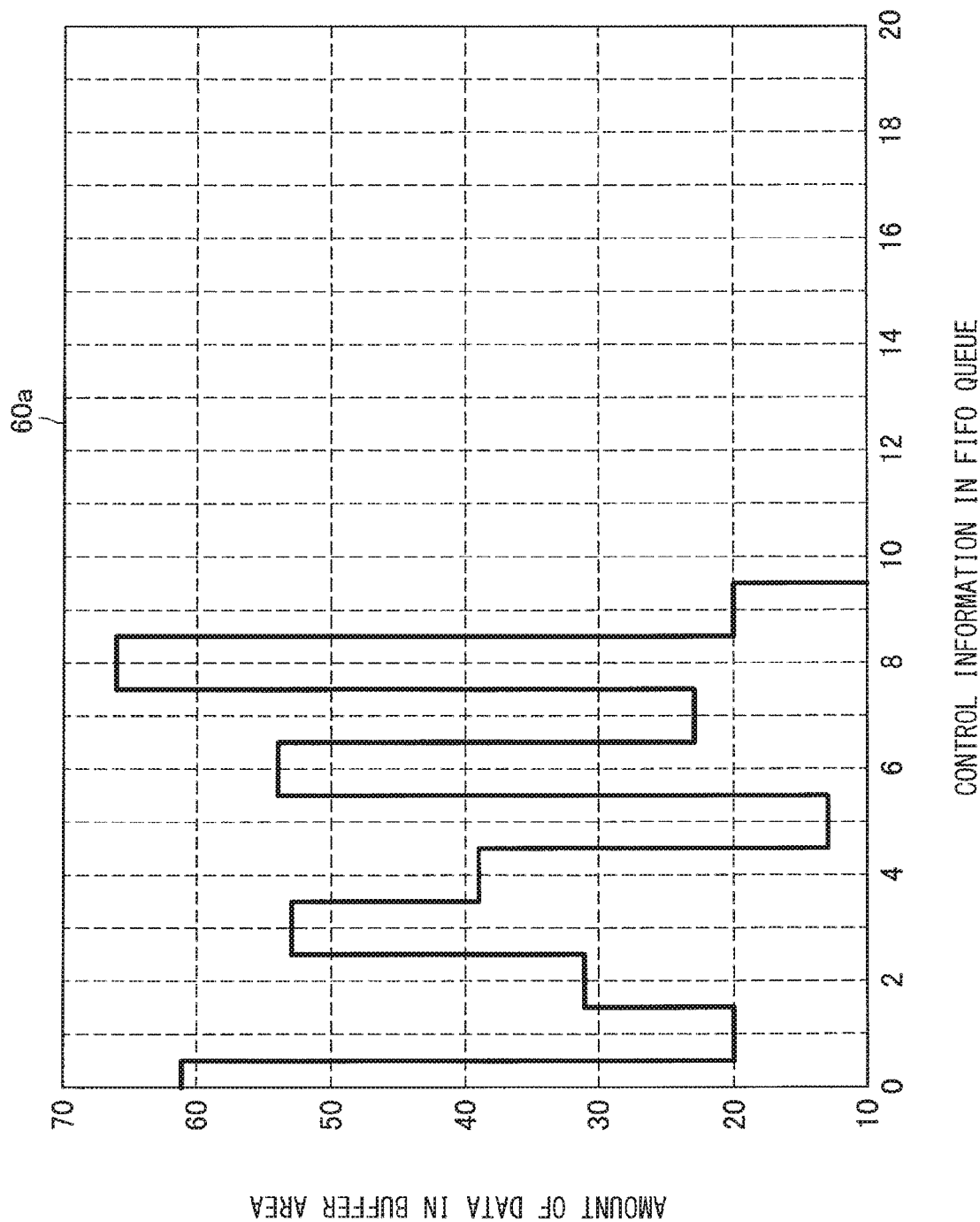
[FIG. 10]

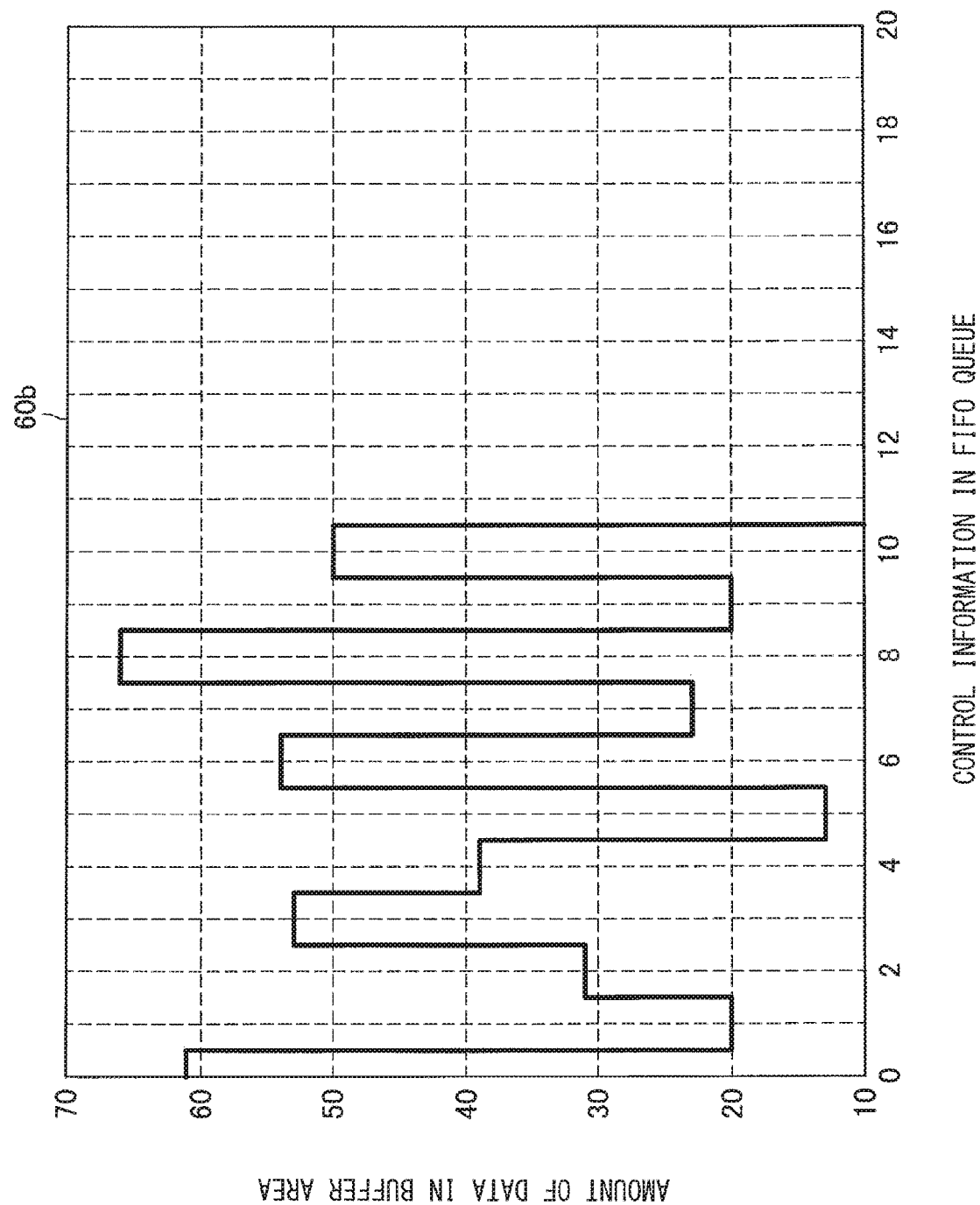
[FIG. 11]

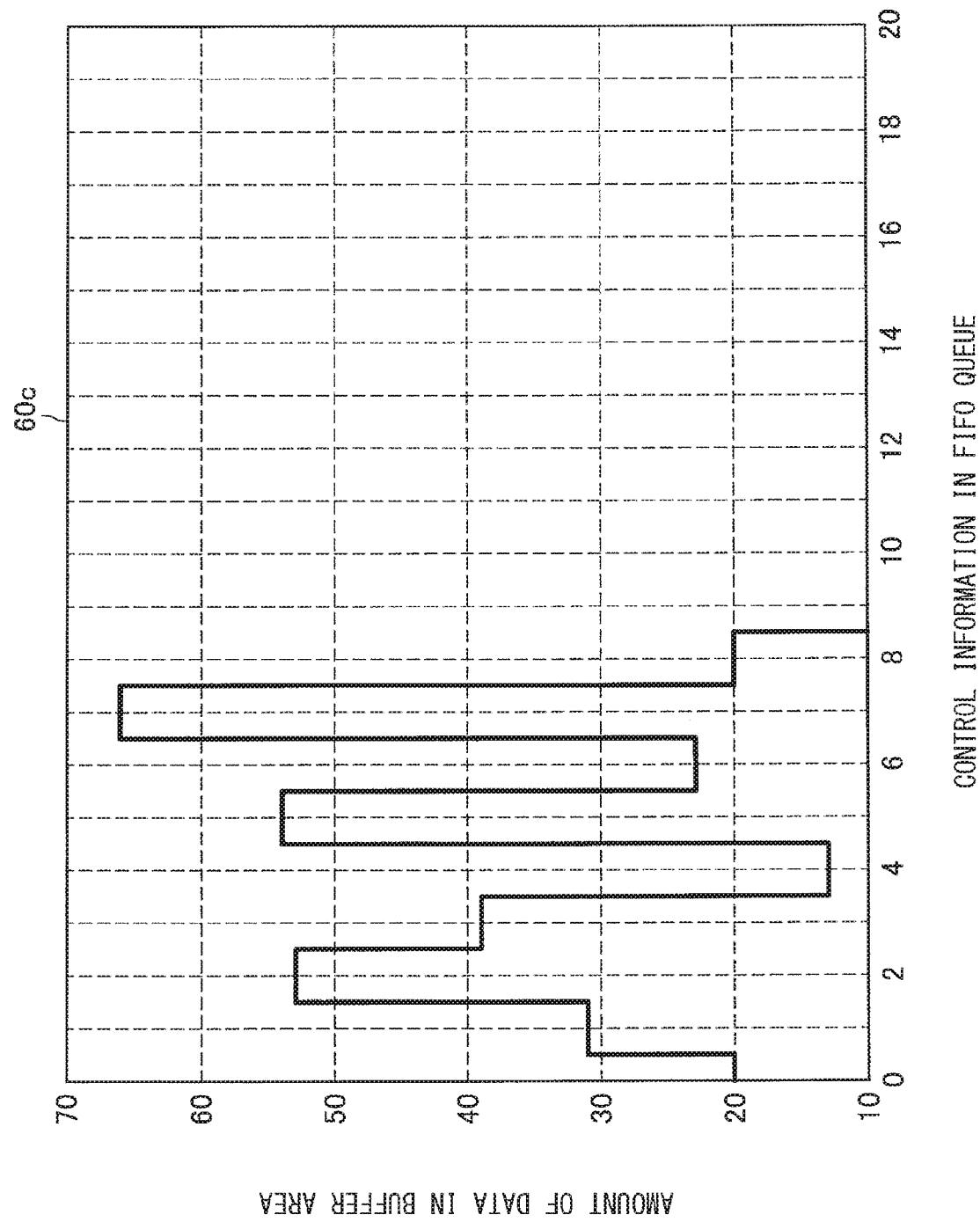
[FIG. 12]

[ FIG. 13 ]
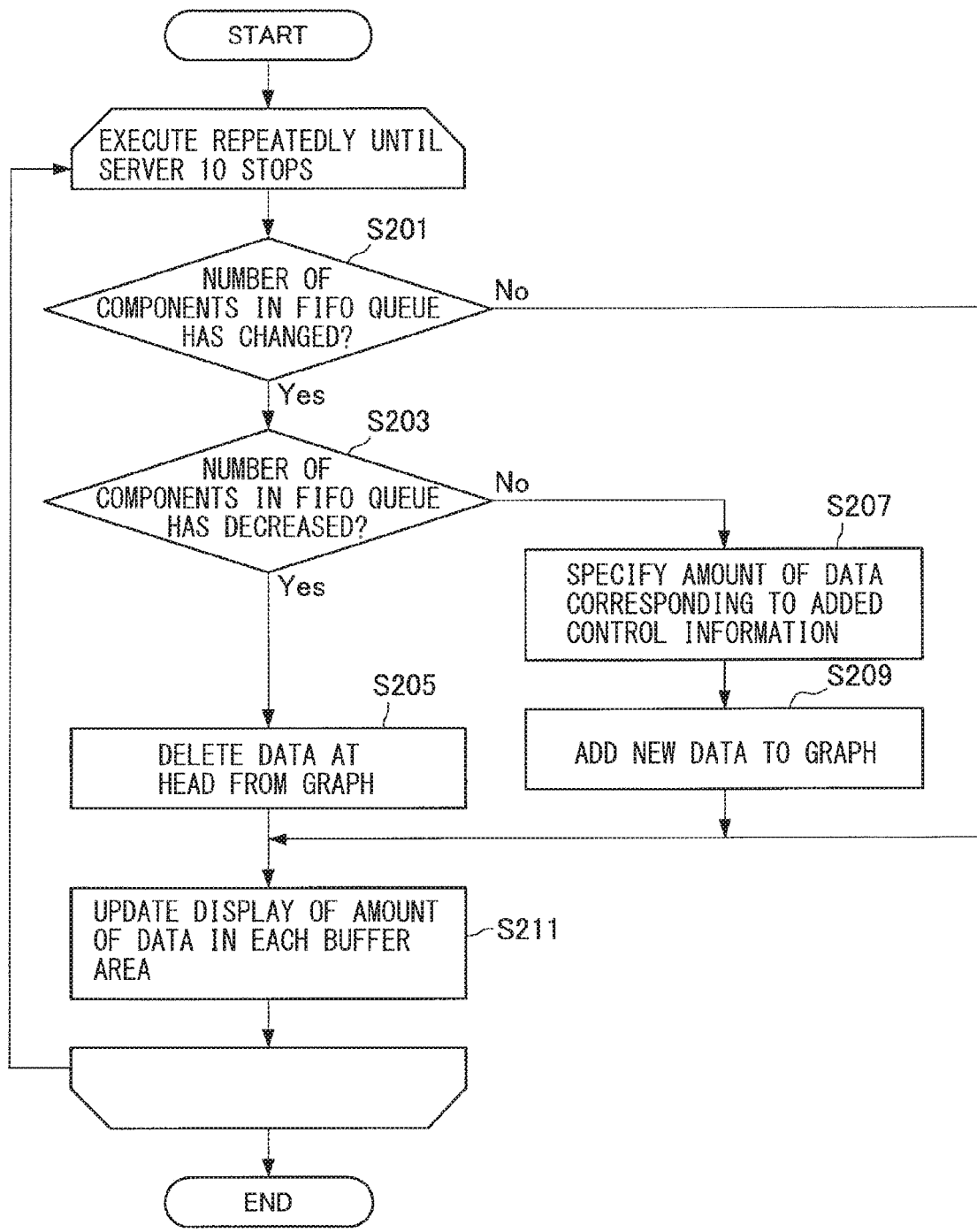

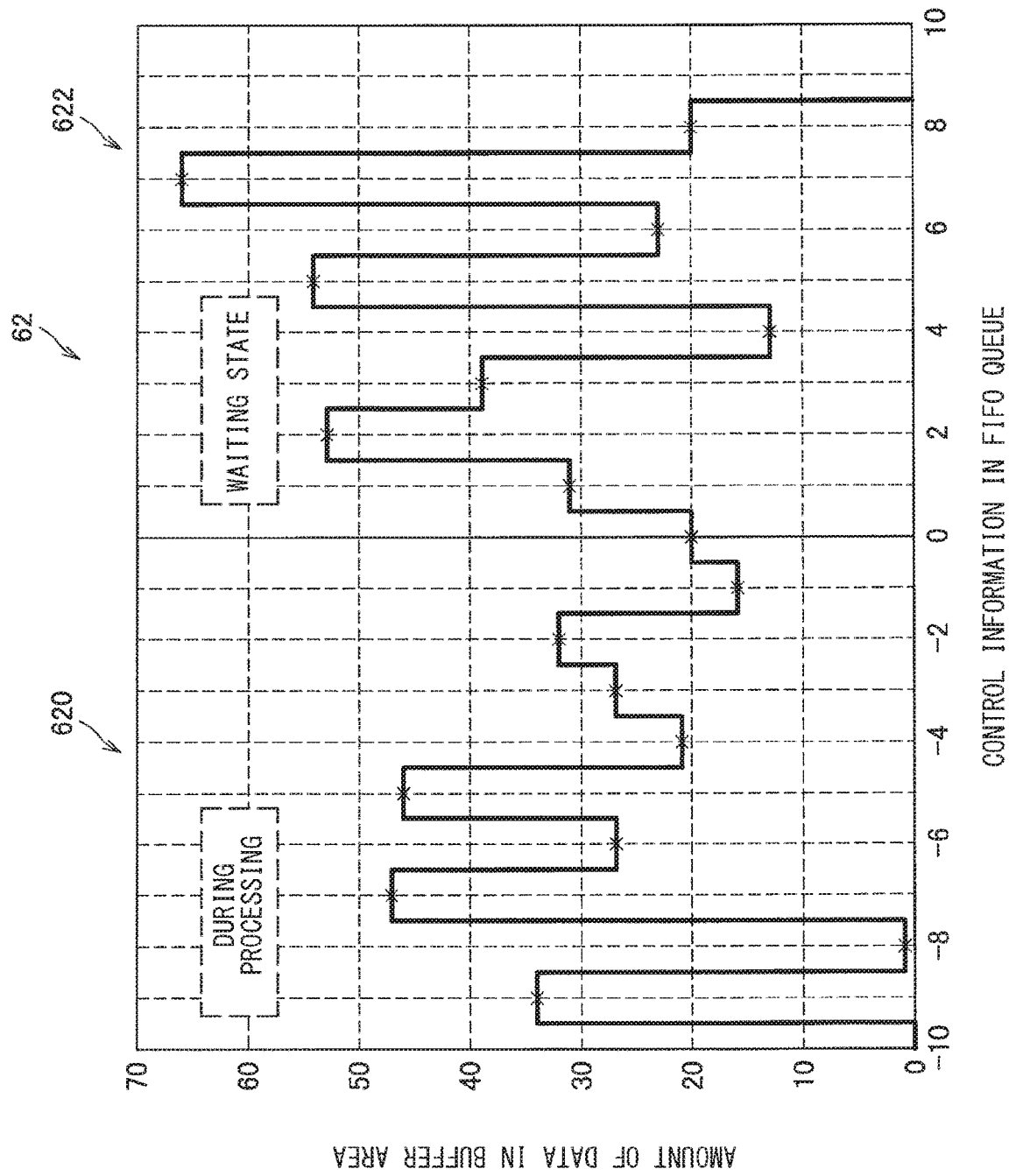
[FIG. 14]

[ FIG. 15 ]
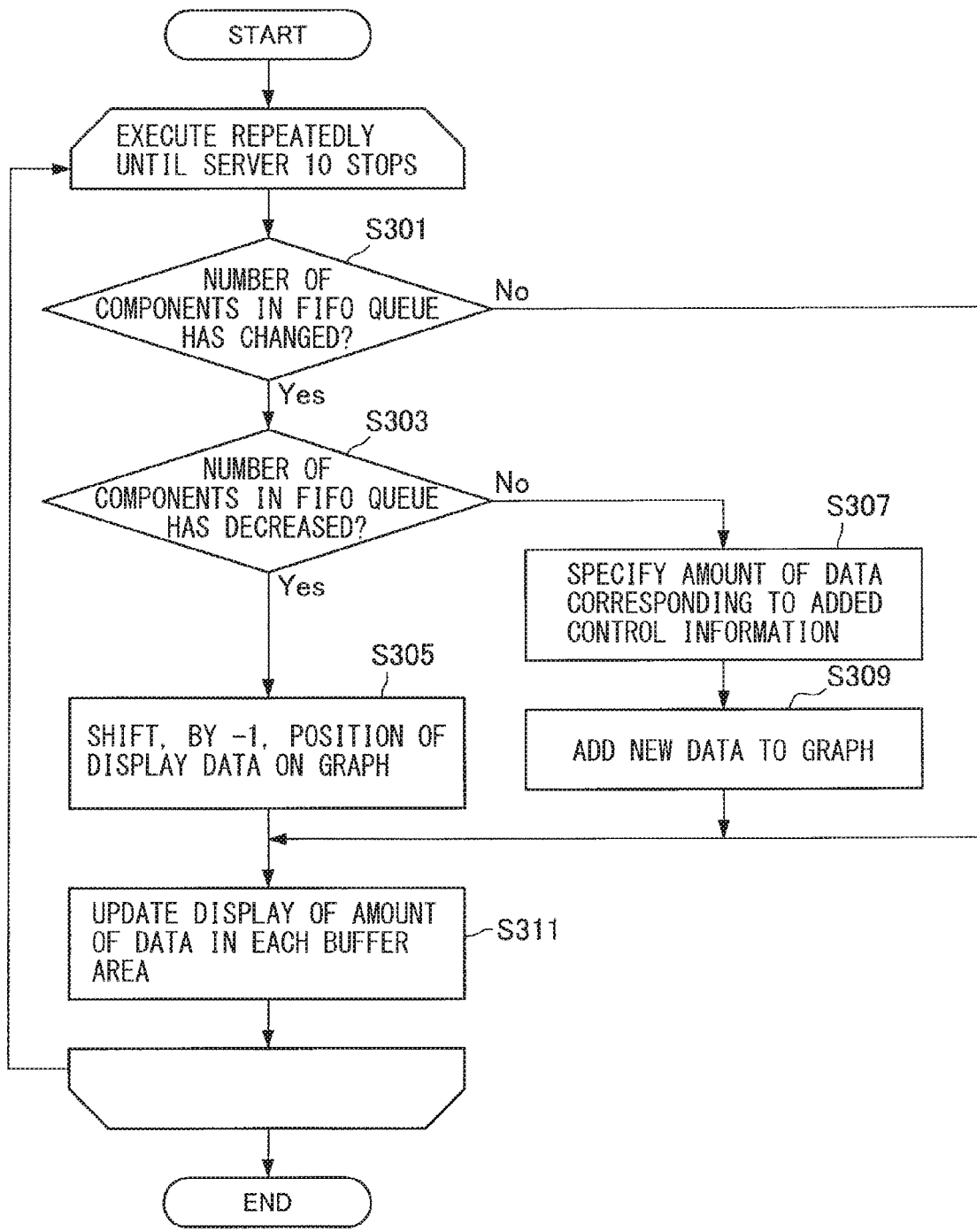

[FIG. 16]
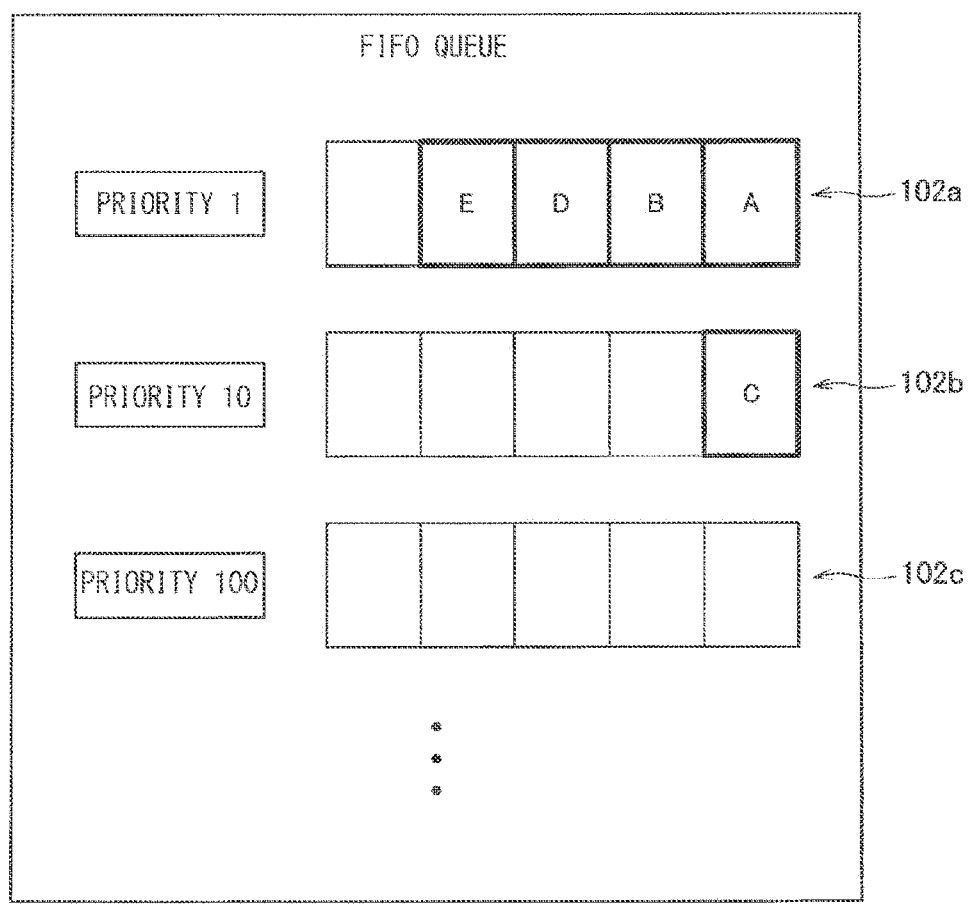

[ FIG. 17 ]
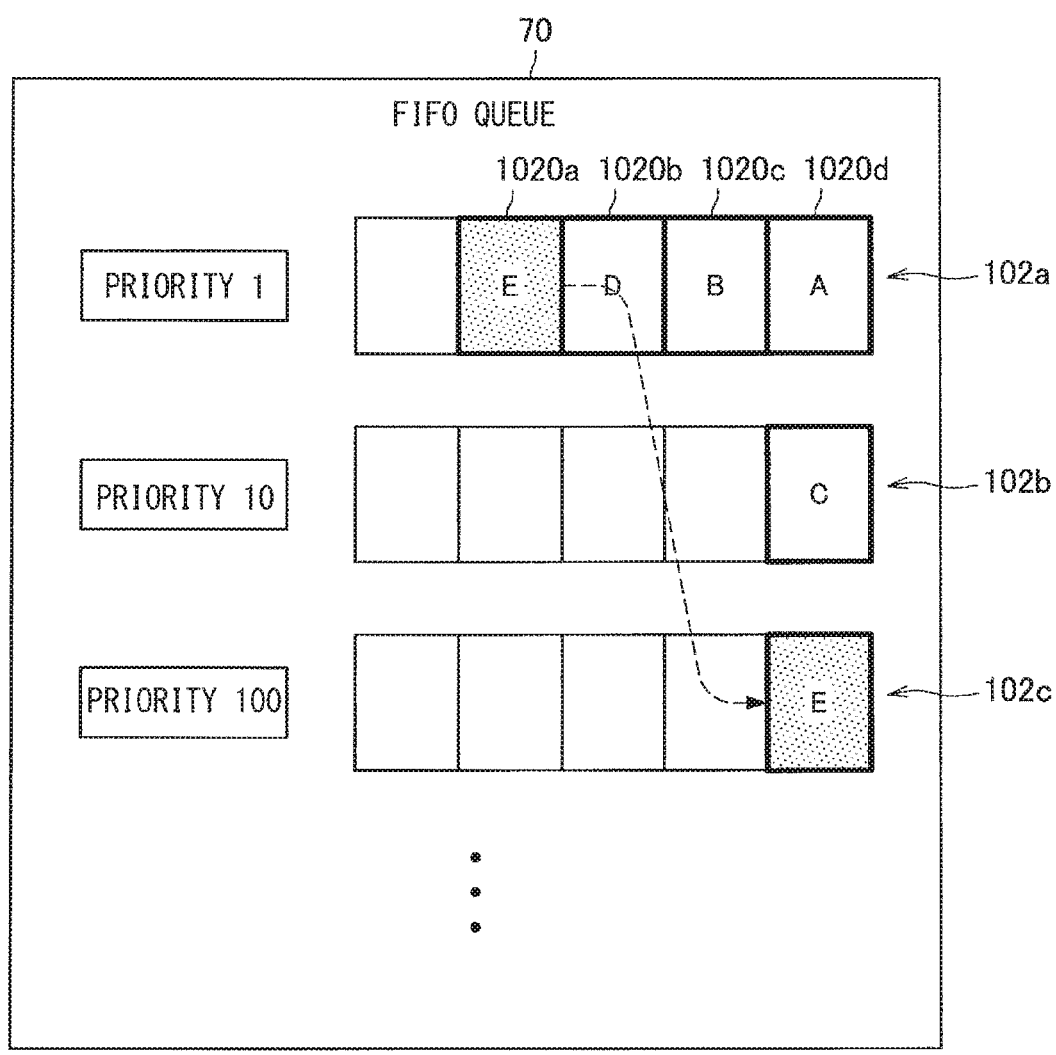

[ FIG. 18 ]
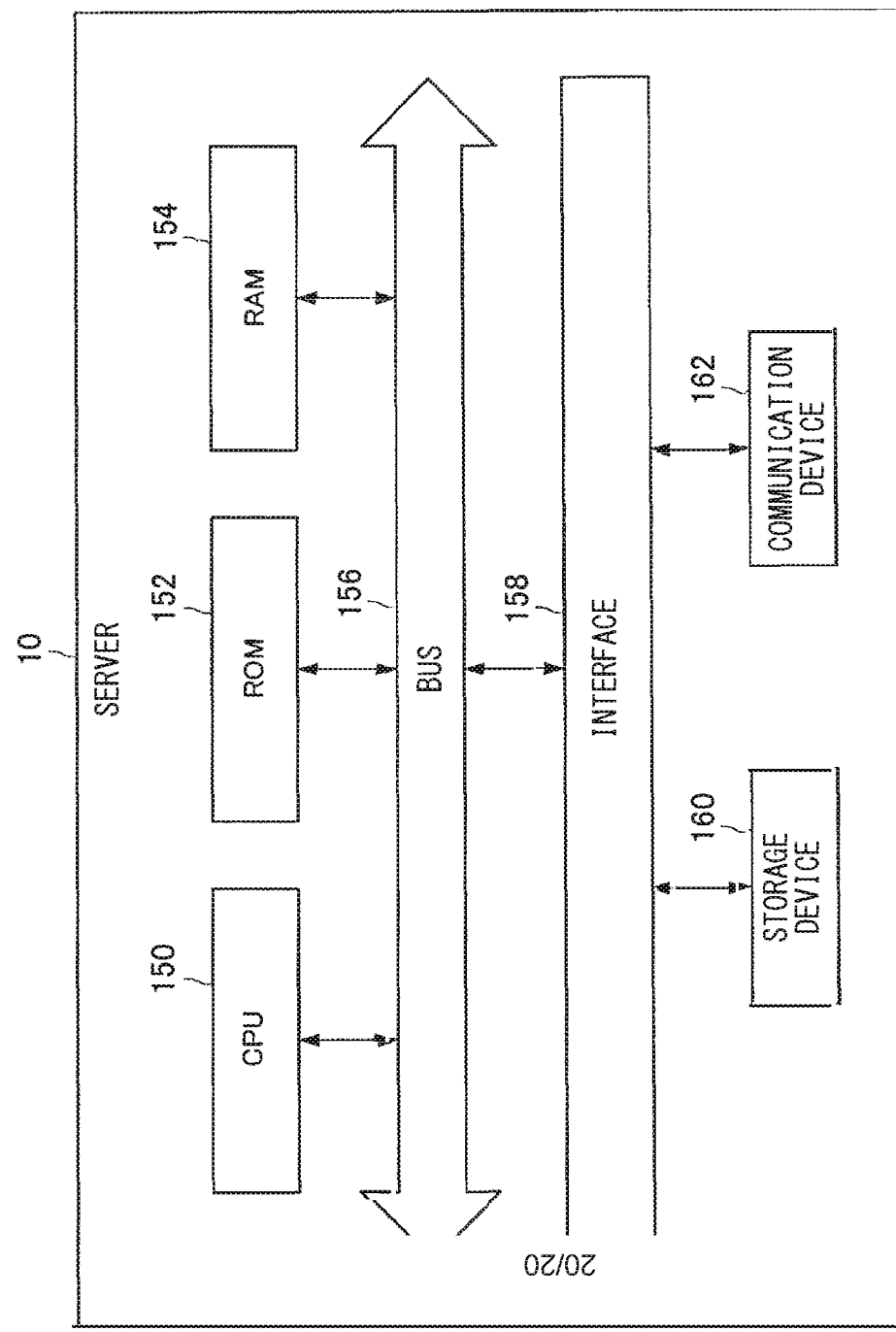

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2018/030891 filed on Aug. 22, 2018, which claims priority benefit of Japanese Patent Application No. JP 2017-222787 filed in the Japan Patent Office on Nov. 20, 2017. Each of the above-referenced applications is hereby incorporated herein by reference in its entirety.

TECHNICAL FIELD

The present disclosure relates to an information processing device, an information processing method, and a program.

BACKGROUND ART

Various technologies have been proposed for transmitting data such as voice and a moving image via a network, for example.

For example, PTL 1 describes a technique of using a transmission band being a free region for a transmission process of traffic with lower priority, which does not call for real-time demand, when transmitting stream data.

CITATION LIST

Patent Literature

PTL 1: Japanese Unexamined Patent Application Publication No. 2003-143222

SUMMARY OF THE INVENTION

Problems to be Solved by the Invention

Meanwhile, it is assumed that a portion of input data is received from another device. However, the technique described in PTL 1 does not consider about appropriately storing each individual piece of partial data in a storage area in such a situation.

Accordingly, the present disclosure proposes an information processing device, an information processing method, and a program that are a novel and improved, and are able to appropriately store each individual piece of partial data received from another device in a buffer area.

Means for Solving the Problems

According to the present disclosure, there is provided an information processing device including a receiver that receives a plurality of pieces of control information from another device, and a controller that adds, in order of reception, a plurality of pieces of control information received from another device to a predetermined storage area, and adds, to a first buffer area related to first control information stored in the predetermined storage area, partial data of first input data corresponding to the first control information, in accordance with order of reception of the partial data.

Further, according to the present disclosure, there is provided an information processing method including receiving a plurality of pieces of control information from another device, and adding in order of reception, by a processor, a plurality of pieces of control information received from another device to a predetermined storage area, and adds, to a first buffer area related to first control information stored in the predetermined storage area, partial data of first input data corresponding to the first control information, in accordance with order of reception of the partial data.

Further, according to the present disclosure, there is provided a program for causing a computer to function as a receiver that receives a plurality of pieces of control information from another device, and a controller that adds, in order of reception, a plurality of pieces of control information received from another device to a predetermined storage area, and adds, to a first buffer area related to first control information stored in the predetermined storage area, partial data of first input data corresponding to the first control information, in accordance with order of reception of the partial data.

Effects of the Invention

As described above, according to the present disclosure, it is possible to appropriately store each individual piece of partial data received from another device in the buffer area. It should be noted that the effects described here are not necessarily limitative, but may be any of effects described in the present disclosure.

BRIEF DESCRIPTION OF DRAWINGS

FIG. 1 is an explanatory diagram illustrating a configuration example of an information processing system common to each embodiment of the present disclosure.

FIG. 2 is a diagram illustrating examples of operation information according to each embodiment.

FIG. 3 is a diagram illustrating an example of input data according to each embodiment.

FIG. 4 is a functional block diagram illustrating a configuration example of a server 10 according to a first embodiment of the present disclosure.

FIG. 5 is a diagram illustrating an example of storing each individual piece of partial data in each individual buffer area 108.

FIG. 6A is a diagram illustrating an example of retrieving control information from a FIFO queue 102.

FIG. 6B is a diagram illustrating an example of retrieving control information from the FIFO queue 102.

FIG. 6C is a diagram illustrating an example of retrieving control information from the FIFO queue 102.

FIG. 7 is a sequence diagram illustrating an example of a flow of processes when inputting input data according to the first embodiment.

FIG. 8 is a sequence diagram illustrating an example of a flow of processes when processing the input data according to the first embodiment.

FIG. 9 is a flowchart illustrating a flow of "information input/output processes" according to the first embodiment.

FIG. 10 is a diagram illustrating an example of a graph indicating a correspondence relationship between each control information in the FIFO queue 102 and an amount of data in the buffer area 108 according to an application example 1 of the first embodiment.

FIG. 11 is a diagram illustrating an example of a graph indicating a correspondence relationship between each control information in the FIFO queue 102 and an amount of data in the buffer area 108 according to the application example 1.

FIG. 12 is a diagram illustrating an example of a graph indicating a correspondence relationship between each control information in the FIFO queue 102 and an amount of data in the buffer area 108.

FIG. 13 is a flowchart illustrating a flow of display control on a monitor terminal 22 according to the application example 1.

FIG. 14 is a diagram illustrating an example of a graph indicating a correspondence relationship between each control information in the FIFO queue 102 and an amount of data in the buffer area 108 according to an application example 2 of the first embodiment.

FIG. 15 is a flowchart illustrating a flow of display control on the monitor terminal 22 according to the application example 2.

FIG. 16 is a diagram illustrating an example of a plurality of FIFO queues 102 according to a second embodiment of the present disclosure.

FIG. 17 is a diagram illustrating an example of a display screen indicating a storage state of each individual piece of control information in each individual FIFO queue 102 according to the second embodiment.

FIG. 18 is a diagram illustrating a hardware configuration example of the server 10 common to each embodiment.

MODES FOR CARRYING OUT THE INVENTION

The following describes a preferred embodiment of the present disclosure in detail with reference to the accompanying drawings. It is to be noted that, in this description and the accompanying drawings, components that have substantially the same functional configuration are indicated by the same reference signs, and thus redundant description thereof is omitted.

Further, in this specification and the drawings, there are cases in which a plurality of components having substantially the same functional configuration are distinguished by adding different alphabets after the same reference numeral. For example, a plurality of components having substantially the same functional configuration are distinguished as needed as a processing server 20a and a processing server 20b. However, in a case where it is not necessary to particularly distinguish a plurality of components having substantially the same functional configuration, only the same reference numeral is attached. For example, in a case where it is not necessary to particularly distinguish the processing server 20a from the processing server 20b, the processing server 20a and the processing server 20b are simply referred to as the processing server 20.

Further, in the following, the "Modes for Carrying Out the Invention" will be described in accordance with the following order.
1. Background
2. Configuration of Information Processing System
3. First Embodiment
4. Second Embodiment
5. Hardware Configuration
6. Modification Example

1. Background

First, a background for creating the embodiments of the present disclosure will be described. Recently, a service has become widespread in which input information (request) from a user to a web service is, for example, an utterance of the user or a live moving image during shooting. In many of such requests, there are many cases where the end of the request is often unknown in advance, because generation of data begins at or immediately before the request is sent. Examples of such web services include voice recognition services using databases on the cloud. In voice recognition services, for example, a user terminal transmits an utterance of a user as a voice request to a server, and the server converts the received voice request into a text by voice recognition. The converted text may be used, for example, as a search phrase of a web search engine or a control command for another electronic device.

Incidentally, in known web services, when a server becomes heavily loaded, the server temporarily rejects a request from a user and demands the user to retry. However, in services such as voice recognition, it is undesirable to reject the user's inputs, as this can place a large burden on the user. For example, to retry, the user has to repeat the same utterance again. In contrast, if a processing server accepts a new input regardless of the heavily loaded condition, the delay in the process of another user whose input has already been accepted may increase.

As a method for solving the above issues, a method using a message queue has been proposed. The message queue is a device used, for example, to transfer messages between a plurality of servers and to wait in a line of processes. In a case where the message queue is used, a function of accepting a request and a function of processing the request are carried out by different devices instead of collectively carried out by a single device. Thus, even in a case where a processing capacity of the device for processing the request is overloaded, it is possible to accept the request of the user without rejecting the request, and to cause the request to wait in a line.

However, in the known message queue, it is not possible for the server to accept input information (request) from the user until all the user inputs have been completed. Therefore, there is an issue that the process is delayed depending on the length of time of the input from the user.

Accordingly, a server 10 according to embodiments of the present disclosure has been created in view of the above circumstances. The server 10 adds a plurality of pieces of control information from one or more user terminals 30 to a FIFO (First In First Out) queue 102 in order of reception, and adds, to a buffer area 108 associated with certain control information stored in the FIFO queue 102, partial data of input data corresponding to the control information, in accordance with order of reception of the partial data. Therefore, it is possible to appropriately store each individual piece of partial data received from the user terminal 30 in the buffer area 108. As a result, it is possible to improve efficiency of a process in a scene in which the processing of input data corresponding to each individual piece of control information received from user terminal 30 is demanded. Here, the FIFO queue 102 serves as an example of a predetermined storage area according to the present disclosure.

2. Configuration of Information Processing System

Next, referring to FIG. 1, an exemplary configuration of an information processing system common to the embodiments of the present disclosure will be described. As illustrated in FIG. 1, the information processing system according to each embodiment includes a server 10, one or more processing servers 20, a monitor terminal 22, a communication network 24, and one or more user terminals 30.

[2-1. Server 10]

The server 10 is an example of an information processing device according to the present disclosure. The server 10 inputs and outputs information on the basis of operation information received from each individual user terminal 30 or each individual processing server 20. For example, the server 10 retrieves, on the basis of operation information received from each individual user terminal 30, information stored in the operation information, and stores the information. Further, the server 10 retrieves information specified by operation information received from each individual processing server 20 out of information stored in the server 10, and provides the information to the processing server 20.

FIG. 2 is a diagram illustrating specific examples of the operation information (operation information 40a to operation information 40d). As illustrated in FIG. 2, operation information 40 may include a command 400 for issuing an instruction to input information to the server 10 or to output information from the server 10, and identification information 402 of a destination of the command. The destination of the commands, which will be described in detail later, may be the FIFO queue 102 or any buffer area 108, which will be described later. FIG. 2 illustrates an exemplary case in which the command for issuing an instruction to input information to the server 10 is "PUSH" and the command for issuing an instruction to output information from the server 10 is "POP".

Further, in a case where the operation information issues an instruction to input information to the server 10 (in other words, in a case where the information is operation information received from the user terminal 30), the operation information includes information 404 to be inputted to the server 10. The information 404 to be inputted is control information or one piece of partial data of entire input data. Here, the input data is data to be processed by the processing server 20 to be described later. For example, the input data is stream data (i.e., continuous pieces of data). The input data may be binary data such as sounds or images, or textual data such as other types of sensor data. The entire input data may be configured as one or more pieces of partial data in combination. In addition, each of the one or more pieces of partial data may be different from each other. For example, in a case where the input data is stream data, the one piece of partial data of the entire input data may be data corresponding to one block of the stream data.

Further, the control information may be information for designating, for example, contents of processes to be performed by the processing server 20, which will be described later, with respect to partial data of input data corresponding to the control information. The control information may be generated by the user terminal 30, as described below. The contents of control information may be designated by the user terminal 30. Hereinafter, each individual piece of partial data of entire input data corresponding to certain control information is referred to as "each individual piece of partial data corresponding to certain control information".

In the example illustrated in FIG. 2, the operation information 40a is operation information received from the user terminal 30 and is operation information for issuing an instruction to add control information 404a to the FIFO queue 102. As illustrated in FIG. 2, the control information 404a includes, for example, an ID of the control information 404a, creation date and time of the control information 404a, designation of type of a process (such as the method) to be performed by the processing server 20 on each individual piece of partial data corresponding to the control information 404a, and arguments of the method.

[2-2. Processing Server 20]

The processing server 20 is an example of a processing device according to the present disclosure. The processing server 20 performs various processes such as, for example, voice recognition, moving image processing, or data distribution on each individual piece of partial data received from the server 10. For example, the processing server 20 performs, on one piece of partial data received from the server 10, a process designated by control information corresponding to the partial data, which is received from server 10.

For example, the processing server 20 first transmits, to the server 10, operation information for issuing an instruction to output any piece of control information stored in the server 10. Thereafter, in a case where a certain piece of control information is received from the server 10, the processing server 20 transmits, to the server 10, operation information for issuing an instruction to output one piece of partial data corresponding to the control information. Thereafter, in a case where one piece of partial data is received from server 10, the processing server 20 performs, on the partial data (which has already been received from the server 10), a process the contents of which is designated by control information corresponding to the partial data. It is to be noted that the processing server 20 basically operates asynchronously with the user terminal 30.

[2-3. User Terminal 30]

The user terminal 30 is an example of another device according to the present disclosure. The user terminal 30 is an information processing terminal used by a user. The user terminal 30 may be a stationary device, a portable device, or a wearable device. The user terminal 30 includes various sensors, such as, for example, a microphone, a camera (image sensor), a depth sensor, and/or an accelerometer.

The user terminal 30 generates operation information including either control information or partial data of input data, for example, on the basis of a user's operation. For example, the user terminal 30 regards various sensing results sensed by the user terminal 30 as one piece of partial data, and generates operation information including the partial data. In addition, every time the user terminal 30 generates the operation information, for example, the user terminal 30 transmits the generated operation information to the server 10 via the communication network 24 to be described later.

FIG. 3 is a diagram illustrating an example of entire input data (input data 50) sensed by the user terminal 30. The input data 50 is, for example, entire voice data of a user sensed by the user terminal 30. In the example illustrated in FIG. 3, a total sensing duration of the input data 50 is "40 milliseconds". Every time the sensing time of 10 milliseconds elapses, for example, the user terminal 30 transmits operation information including only one piece of partial data 500, which is a voice sensing result in the corresponding sensing time, to the server 10, and the pieces of operation information are transmitted sequentially. In this way, the user terminal 30 may sequentially transmit the pieces of inputted partial data 500 to the server 10 at regular intervals (or in small increments). For example, even in a case where the end of the input, such as the user's utterance, is unknown in advance, the user terminal 30 may transmit, to the server 10, only fragmentary data (i.e., one piece of partial data) that has been inputted up to the present time, and the pieces of fragmentary data are transmitted sequentially.

[2-4. Monitor Terminal 22]

The monitor terminal 22 is a device for a supervisor to monitor, for example, an operating status of the server 10, the number and contents of various pieces of data (such as control information and partial data) stored in the server 10, and the like. The monitor terminal 22 includes, for example, an input section (e.g., a mouse or a touch panel) for a user to operate, a display unit (e.g., an LCD (Liquid Crystal Display) or an OLED (Organic Light Emitting Diode)) for displaying a display screen, and a communication section for communicating with the server 10 or the like via the communication network 24.

[2-5. Communication Network 24]

The communication network 24 is a wired or radio transmission path for information transmitted from a device coupled to the communication network 24. For example, the communication network 24 may include a public network such as a telephone network, the Internet, a satellite communication network, and the like, and various LANs (Local Area Networks), WANs (Wide Area Networks), and the like including Ethernet (registered trademark). Further, the communication network 24 may also include a private network such as IP-VPN (Internet Protocol-Virtual Private Network).

The configuration of the information processing system common to the embodiments of the present disclosure has been described above. Next, the contents of each embodiment of the present disclosure will be described in detail.

3. First Embodiment

3-1. Configuration

First, description will be given on a first embodiment. FIG. 4 is a functional block diagram illustrating a configuration example of the server 10 according to the first embodiment. As illustrated in FIG. 4, the server 10 includes a controller 100, the FIFO queue 102, a buffer manager 104, an entire buffer area 106, a monitor section 110, a display controller 112, an operation section 114, and a communication section 120. Further, the entire buffer area 106 includes one or more buffer areas 108.

[3-1-1. FIFO Queue 102]

The FIFO queue 102 may include a storage device 160 to be described later. The FIFO queue 102 is a storage area that stores each individual piece of control information received from one or more user terminals 30 in a first-in-first-out (FIFO) configuration. That is, regarding one or more pieces of control information stored in the FIFO queue 102, the order in which the one or more pieces of control information are retrieved from the FIFO queue 102 is such that, the earlier the order of storage, the earlier the order of being retrieved. The size of the FIFO queue 102 may be determined in advance. Alternatively, for example, the controller 100 to be described later may dynamically increase the size of the FIFO queue 102 in accordance with the number or the data size of received pieces of control information.

[3-1-2. Entire Buffer Area 106]

The entire buffer area 106 is an example of a storage section according to the present disclosure. The entire buffer area 106 may include the storage device 160 to be described later. The entire buffer area 106 is where each individual buffer area 108 is generated. For example, the entire buffer area 106 includes memories, file systems, and the like.

[3-1-3. Buffer Area 108]

Each individual buffer area 108 is a storage area that stores each individual piece of partial data corresponding to control information associated with the buffer area 108 received from one or more user terminals 30, in a first-in-first-out (FIFO) data-structure. That is, regarding one or more pieces of partial data stored in the buffer area 108, the order in which the one or more pieces of partial data are retrieved from the buffer area 108 is such that, the earlier the order of storage, the earlier the order of being retrieved.

The number of buffer areas 108 that may be generated may be more than or equal to the number of pieces of control information stored in the FIFO queue 102. The one or more pieces of control information stored in the FIFO queue 102 are respectively associated with buffer areas 108 that are different from each other.

The buffer area 108 may have an address that enables unique specifying. Further, as will be described later, the address of each individual buffer area 108 may be associated with an ID for identification for uniquely specifying the buffer area 108.

It is to be noted that, at the time of starting the server 10, any buffer area 108 may not necessarily be secured, or only a predetermined number of buffer areas 108 may be secured.

[3-1-4. Controller 100]

[3-1-4-1. Addition of Data]

The controller 100 may include, for example, processing circuits such as a CPU (Central Processing Unit) 150 and a GPU (Graphics Processing Unit), which will be described later. The controller 100 inputs (stores) information to and outputs (retrieves) information from the FIFO queue 102 and each individual buffer area 108, on the basis of operation information received from any of the user terminals 30 or any of the processing servers 20.

For example, in a case where operation information including control information is newly received from a user terminal 30, the controller 100 adds the received control information to the FIFO queue 102 in order of reception of pieces of control information from one or more user terminals 30. Further, in a case where operation information including partial data is newly received from a user terminal 30, the controller 100 adds the received partial data to a buffer area 108 associated with control information corresponding to the partial data, out of one or more buffer areas 108 to be described later, in accordance order of reception of each individual partial data corresponding to the control information from the one or more user terminals 30.

For example, in a case where operation information is received from the user terminal 30, the controller 100 first parses the received operation information and specifies a type of information (i.e., control information or partial data) included in the operation information and a storage destination of the information designated by the operation information. Thereafter, in a case where the operation information includes control information, the controller 100 adds the control information to the end of the FIFO queue 102. Further, in a case where partial data is included in the operation information, the controller 100 adds the partial data to the end of the buffer area 108 specified as the storage destination of the partial data.

The above functions will now be described in more detail with reference to FIG. 5. As described above with reference to FIG. 3, it is assumed that, every time partial data 500 of "10 millisecond voice" is sensed in a user terminal 30, the partial data 500 is received from the user terminal 30, for example, and the pieces of partial data 500 are received sequentially. In this case, as illustrated in FIG. 5, every time operation information including one piece of partial data 500 is received from a user terminal 30, the controller 100 adds the newly received partial data 500 to the end of the buffer area 108c associated with control information (control information "A" in the example illustrated in FIG. 5) that has already been received from the user terminal 30, and the pieces of newly received partial data 500 are added sequentially.

It is to be noted that, in a case where control information that has not been associated with any buffer area 108 is received from the user terminal 30, the controller 100 may issue a request to the buffer manager 104 to be described below, to secure a new buffer area 108 for storing each individual partial data corresponding to the control information.

[3-1-4-2. Retrieval of Data]

Further, in a case where operation information for issuing an instruction to output control information from the server 10 is received from any of the processing servers 20, the controller 100 may retrieve control information stored at the head in the FIFO queue 102 on the basis of the operation information, and may cause the communication section 120 to transmit the retrieved control information to the corresponding processing server 20. For example, every time the operation information for issuing an instruction to output control information is received from any of the processing servers 20, the controller 100 first retrieves the control information (i.e., control information whose order of storage is the earliest) stored at the head in the FIFO queue 102 from the FIFO queue 102, and causes the communication section 120 to transmit the retrieved control information to the processing server 20.

Further, in a case where operation information for issuing an instruction to output of a certain piece of partial data from the server 10 is received from any of the processing servers 20, the controller 100 may retrieve partial data stored at the head in a buffer area 108 associated with control information corresponding to the partial data on the basis of the operation information, and may cause the communication section 120 to transmit the retrieved partial data to the processing server 20. For example, every time the operation information for issuing an instruction to output a certain piece of partial data is received from any of the processing servers 20, the controller 100 first specifies a target buffer area 108 from all buffer areas 108 on the basis of an ID for identifying the buffer area 108 included in the operation information. Next, the controller 100 retrieves the partial data (i.e., partial data whose order of storage is the earliest) stored at the head in the target buffer area 108 from the target buffer area 108. Thereafter, the controller 100 causes the communication section 120 to transmit the retrieved partial data to the processing server 20.

Specific Examples

Referring now to FIGS. 6A to 6C, the above functions will be described in more detail. As illustrated in FIG. 6A, it is now assumed that six pieces of control information are stored in the FIFO queue 102. Further, it is assumed that two processing servers 20 are installed, and each individual processing server 20 is able to process each individual partial data corresponding to each of the two pieces of control information at the same time. At the time point illustrated in FIG. 6A, it is assumed that each individual processing server 20 does not process any piece of partial data.

Each of the two processing servers 20 transmits twice operation information for issuing an instruction to output control information to the server 10. Every time the operation information is received, the controller 100 of server 10 retrieves control information stored at the head in the FIFO queue 102, and causes the communication section 120 to transmit the retrieved control information to the processing server 20 from which the operation information has been transmitted. Thus, as illustrated in FIG. 6B, the first four pieces of control information (i.e., the pieces of control information "A" to "D") stored in the FIFO queue 102 are retrieved, and two pieces out of the four pieces of control information are transmitted to each of the two processing servers 20.

It is assumed that, after the time point illustrated in FIG. 6B, the processing server 20a completed a process on all pieces of partial data corresponding to the control information "A" (i.e., the entire input data corresponding to the control information "A"). It is also assumed that the processing server 20a newly transmitted operation information for issuing an instruction to output control information to the server 10. In this case, as illustrated in FIG. 6C, the controller 100 of the server 10 retrieves control information (i.e., control information "E") stored at the head in the FIFO queue 102, and causes the communication section 120 to transmit the control information "E" to the processing server 20a.

[3-1-5. Buffer Manager 104]

The buffer manager 104 generates or deletes one or more buffer areas 108 on the basis of a request from the controller 100. For example, in a case where operation information including control information that has not been associated with any buffer area 108 is received from the user terminal 30, the buffer manager 104 first generates (e.g., dynamically reserves), in the entire buffer area 106, a new buffer area 108 for storing each individual partial data corresponding to the control information. Thereafter, the buffer manager 104 associates the buffer area 108 with the ID for identifying the buffer area 108. For example, the buffer manager 104 associates the address of the buffer area 108 with the ID for identifying the buffer area 108.

It is to be noted that the ID for identifying each individual buffer area 108 may be determined as follows. For example, every time operation information including new control information is received from the user terminal 30, the controller 100 may generate an ID for identifying a buffer area 108 associated with the control information by using a predetermined one-way function and the control information.

Alternatively, the user terminal 30 may determine the ID for identifying the buffer area 108 associated with control information to be transmitted. In this case, the user terminal 30 may transmit, to the server 10, operation information including control information and an ID for identifying a buffer area 108 corresponding to the control information. Further, in a case where the operation information is received, the buffer manager 104 may associate a buffer area 108 associated with control information in the operation information with an ID for identifying the buffer area 108 in the operation information.

[3-1-6. Monitor Section 110]

The monitor section 110 monitors states of the FIFO queue 102 and each individual buffer area 108. For example, monitor section 110 monitors the total number of pieces of control information in the FIFO queue 102, the speed at which control information is inputted to the FIFO queue 102, the speed at which control information is outputted from the FIFO queue 102, contents of each individual piece of control information stored in the FIFO queue 102, and the like. In addition, the monitor section 110 monitors the number of buffer areas 108 currently created, the amount of data stored in each individual buffer area 108, the speed at which partial data is inputted to each individual buffer area 108, the speed at which partial data is outputted from each individual buffer area 108, and the like.

It is to be noted that the results of detecting the input speed and the output speed of control information and the input speed and the output speed of partial data may be presented to a supervisor who uses the monitor terminal 22. The supervisor is able to determine whether or not errors have occurred in the server 10 by referring to these detection results.

[3-1-7. Display Controller 112]

The display controller 112 controls display of the monitor terminal 22 using information acquired by the monitor section 110. For example, the display controller 112 generates display information for monitoring (e.g., character strings, tables, graphs, etc.) using the information acquired by the monitor section 110, and causes the monitor terminal 22 to display the display information. For example, the monitor terminal 22 may display the display information using a web browser.

[3-1-8. Operation Section 114]

In a case where instruction information of a user (such as a supervisor) is received from the monitor terminal 22, the operation section 114 changes information stored in the FIFO queue 102 or each individual buffer area 108 on the basis of the instruction information. For example, in a case where instruction information for changing the order relationship of two or more pieces of control information stored in the FIFO queue 102 is received from the monitor terminal 22, the operation section 114 changes the order relationship of the pieces of control information stored in the FIFO queue 102 in accordance with the instruction information.

As a modification example, the controller 100 and the operation section 114 may be configured integrally, instead of being configured separately from each other.

[3-1-9. Communication Section 120]

The communication section 120 is an example of a receiver and a transmitter according to the present disclosure. The communication section 120 may include a communication device 162 to be described later. The communication section 120 transmits and receives information to and from other devices via, for example, the communication network 24. For example, the communication section 120 receives operation information from one or more user terminals 30 and one or more processing servers 20. The communication section 120 transmits, to a target processing server 20, control information retrieved from the FIFO queue 102 or partial data retrieved from any of the buffer areas 108, in accordance with the control of the controller 100.

3-2. Flow of Processes

The configuration of the first embodiment has been described above. Next, a flow of processes according to the first embodiment will be described in "3-2-1. Flow of Processes When Inputting Input Data" and "3-2-2. Flow of Processes When Processing Input Data".

[3-2-1. Flow of Processes when Inputting Input Data]

First, referring to FIG. 7, a "flow of processes when inputting input data" will be described. FIG. 7 is a sequence diagram illustrating an example of a flow processes when inputting input data. Here, an example of a case where one user terminal 30 transmits operation information to the server 10 will be described.

As illustrated in FIG. 7, first, the user terminal 30 generates operation information including control information on the basis of an operation of a user, for example. Thereafter, the user terminal 30 transmits the generated operation information to the server 10 (S101). After that, the controller 100 of the server 10 performs "information input/output processes" to be described later (S103).

After S101, the user terminal 30 starts inputting (sensing, etc.) input data corresponding to the control information (S105). The user terminal 30 then determines whether or not duration time of inputting of the input data has reached a predetermined time. It is to be noted that if the duration time of the inputting of the input data has already reached the predetermined time at least once, the user terminal 30 determines whether or not duration time length since the previous partial data transmission to the server 10 has reached the predetermined time (S107).

In a case where the duration time of the inputting of the input data has reached the predetermined time (S107: Yes), the user terminal 30 first specifies partial data, of the data that have been inputted so far, that has not been transmitted to the server 10, and then generates operation information including the partial data. Thereafter, the user terminal 30 transmits the generated operation information to the server 10 (S109). The controller 100 of the server 10 then performs processes ("information input/output processes") (S111) that are similar to S103. Thereafter, the user terminal 30 performs S113, which will be described later.

Alternatively, in a case where the duration time of the inputting of the input data has not reached the predetermined time (S107: No), the user terminal 30 next determines whether or not the inputting of the input data has been completed (S113). In a case where the inputting of the input data has not been completed (i.e., is continuing) (S113: No), the user terminal 30 performs the processes after S107 again.

Alternatively, in a case where the inputting of the input data has been completed (S113: Yes), the user terminal 30 first specifies partial data that is a portion, of the entire input data, that has not been transmitted to the server 10, and generates operation information including the partial data. Thereafter, the user terminal 30 transmits the generated operation information to the server 10 (S115). The controller 100 of the server 10 then performs processes ("information input/output processes") (S117) that are similar to S103.

[3-2-2. Flow of Processes when Processing Input Data]

Next, referring to FIG. 8, a "flow of processes when processing input data" will be described. FIG. 8 is a sequence diagram illustrating an example of a flow processes when inputting input data. Here, an example of a case where one processing server 20 transmits operation information to the server 10 will be described.

As illustrated in FIG. 8, first, the processing server 20 generates operation information for issuing an instruction to output control information. The processing server 20 then transmits the generated operation information to the server 10 (S151).

The controller 100 of the server 10 then performs processes ("information input/output processes") (S153) that are similar to S103. Thereafter, the communication section 120 transmits the control information retrieved in S153 to the processing server 20 in accordance with control of the controller 100 (S155).

The processing server 20 then generates operation information for issuing an instruction to output one piece of partial data corresponding to the control information received in S155. For example, the processing server 20 stores in advance pieces of information related to a generation rule or an ID system of an ID for identifying a buffer area 108 described above. In this case, the processing server 20 first uses those pieces of information to specify the ID for identifying the buffer area 108 associated with the control information, and then generates the operation information by storing the specified ID for the identification in the operation information.

The processing server 20 then transmits the generated operation information to the server 10 (S157).

The controller 100 of the server 10 then performs processes ("information input/output processes") (S159) that are similar to S103. Thereafter, the communication section 120 transmits the partial data retrieved in S159 to the processing server 20 in accordance with control of the controller 100 (S161).

Thereafter, the processing server 20 performs, on the partial data received in S161, processes of contents designated in the control information received in S155 (S163), for example.

[3-2-3. Information Input/Output Processes]

Next, referring to FIG. 9, a flow of "information input/output processes" in S103(, S111, S117, S153 and S159) will be described. FIG. 9 is a flowchart illustrating the flow of the "information input/output processes". First, as illustrated in FIG. 9, the controller 100 of the server 10 parses the received operation information. For example, the controller 100 specifies a type of a command designated in the operation information and a destination of information in the operation information. Furthermore, in a case where the specified command is "PUSH", the controller 100 retrieves information (specifically, control information or partial data) stored in the operation information (S201).

In a case where the destination specified in S201 is the FIFO queue 102 and the command specified in S201 is "PUSH" (S203: Yes, S205: Yes), the controller 100 next determines whether an amount of information of the control information retrieved in S201 is larger than "0" (S207). In a case where the amount of information of the control information is "0" (S207: No), the "information input/output processes" end. Alternatively, in a case where the amount information of the control information is larger than "0" (S207: Yes), the controller 100 adds the control information to the end of the FIFO queue 102 (S209). Then, the "information input/output processes" end.

Alternatively, in a case where the destination specified in S201 is the FIFO queue 102 and the command specified in S201 is "POP" (S203: Yes, S205: No, S211: Yes), the controller 100 retrieves control information stored at the head of the FIFO queue 102 from the FIFO queue 102 (S213). Then, the "information input/output processes" end.

Alternatively, in a case where the destination specified in S201 is the FIFO queue 102 and the command specified in S201 is none of "PUSH" and "POP" (S203: Yes, S205: No, S211: No), the "information input/output processes" end.

Alternatively, in a case where the destination specified in S201 is any one of the buffer areas 108 and the command specified in S201 is "PUSH" (S203: No, S215: Yes, S217: Yes), the controller 100 next confirms whether or not buffer area 108 of destination is present (S219). In a case where the buffer area 108 of the destination is present (S219: YES), the controller 100 performs a process of S223 (to be described later). Alternatively, in a case where the buffer area 108 of the destination is not present (S219: No), the controller 100 sends a request to the buffer manager 104 to generate the buffer area 108 of the destination. Subsequently, the buffer manager 104 generates the buffer area 108 on the basis of the request, and uniquely associates the generated buffer area 108 with the control information (S221). Thereafter, the controller 100 adds the partial data retrieved in S201 to the end of the buffer area 108 of the destination (S223). Then, the "information input/output processes" end.

Alternatively, in a case where the destination specified in S201 is any one of the buffer areas 108 and the command specified in S201 is "POP" (S203: No, S215: Yes, S217: No, S211: Yes), the controller 100 retrieves partial data stored at the head of the buffer area 108 of the destination from the buffer area 108 (S213). Then, the "information input/output processes" end.

Alternatively, in a case where the destination specified in S201 is any one of the buffer areas 108 and the command specified in S201 is none of the "PUSH" and "POP" (S203: No, S215: Yes, S217: No, S211: No), the "information input/output processes" end. Further, in a case where the destination specified in S201 is neither the FIFO queue 102 nor any of the buffer areas 108 (S203: No, S215: No), the "information input/output processes" end.

3-3. Effects

As described above, the server 10 according to the first embodiment adds a plurality of pieces of control information from one or more user terminals 30 to the FIFO queue 102 in order of reception, and adds, to a buffer area 108 related to certain control information stored in the FIFO queue 102, partial data of input data corresponding to the control information, in accordance with order of reception of the partial data. Thus, according to the first embodiment, storage areas of two FIFO structures (i.e., FIFO queue 102 and each individual buffer area 108) are provided, and the server 10 is able to appropriately store each individual piece of data received from the user terminal 30 to those storage areas. As a result, it is possible to achieve an improvement in efficiency of processes in a case in which input data corresponding to each individual piece of control information received from the user terminal 30 is processed.

For example, every time operation information for issuing an instruction to output certain partial data is received from any of the processing servers 20, the server 10 is able to retrieve partial data stored at the head in a buffer area 108 associated with control information corresponding to the partial data, and transmit the retrieved partial data to the processing server 20. Thus, unlike the known message queue, for example, it is possible to sequentially pass pieces of each individual partial data of entire input data to the processing server 20 before the end of the input data is fixed. Therefore, it is possible to reduce delay time before passing the entire input data to the processing server 20 as compared to a known message queue, thereby improving the efficiency of processes performed on the input data.

Furthermore, according to the first embodiment, it is possible for services or applications in which a length of input data from a user is not determined in advance and it is difficult to reject input from the user, such as voice recognition, to accept and not to reject input from each individual user.

3-4. Application Examples

The first embodiment is not limited to the examples described above. Next, application examples of the first embodiment will be described in "3-4-1. Application Example 1" and "3-4-2. Application Example 2". It is to be noted that components included in the server 10 according to the present application examples are similar to the components in the example illustrated in FIG. 4.

3-4-1. Application Example 1

[3-4-1-1. Display Controller 112]

First, an application example 1 will be described. The display controller 112 according to the application example 1 causes the monitor terminal 22 to display a graph (hereinafter, referred to as a "graph indicating an amount of data for each piece of control information") indicating a relationship between each of one or more pieces of control information stored in the FIFO queue 102 and an amount of data stored in a buffer area 108 associated with the control information.

FIG. 10 is a diagram illustrating an example of a graph (histogram 60) illustrating the amount of data for each piece of control information according to the application example 1. As illustrated in FIG. 10, the histogram 60 indicates the correspondence relationship between each individual piece of control information in the FIFO queue 102 and the amount of data stored in each individual buffer area 108.

Further, every time control information is received from the user terminal 30 and every time each individual piece of partial data corresponding to the control information is received from the user terminal 30, the display controller 112 sequentially updates, in accordance with the reception, a graph indicating the amount of data for each piece of control information displayed on the monitor terminal 22, as illustrated in FIG. 11, for example. FIG. 11 is a diagram illustrating an example of a histogram 60b which has been updated when one piece of control information and one or more pieces of partial data corresponding to the one piece of control information are newly received from the user terminal 30 after the time point of the example illustrated in FIG. 10. In the example illustrated in FIG. 11, the newly received control information has been added to a "10"-th area in the FIFO queue 102, and the amount of data of all pieces of partial data in the buffer area 108 associated with the control information is "50."

Further, every time one piece of control information in the FIFO queue 102 is retrieved from the FIFO queue 102 and the one piece of control information is transmitted to the processing server 20, the display controller 112 sequentially updates, in accordance with the transmission, a graph indicating the amount of data for each piece of control information displayed on the monitor terminal 22 as illustrated in FIG. 12, for example. FIG. 12 is a diagram illustrating a histogram 60c which has been updated when one piece of control information is retrieved from the FIFO queue 102 after the time point of the example illustrated in FIG. 10. As illustrated in FIG. 12, the shape of the histogram 60c may be such that the histogram 60a illustrated in FIG. 10 is shifted by one scale to the left with respect to the horizontal axis.

Modification Examples

It is to be noted that, in each of the graphs of FIGS. 10 to 12 indicating the amount of data for each piece of control information, an example is illustrated in which "the amount of data in the buffer area 108" is set on the vertical axis and "the order of storage of each piece of control information in the FIFO queue 102" is set on the horizontal axis, but the present disclosure is not limited to such an example. For example, the item on the vertical axis and the item on the horizontal axis may be set oppositely. Alternatively, (instead of "the order of storage of each piece of control information in the FIFO queue 102",) other kinds of information that a supervisor is able to specify an order relationship between pieces of control information may be set as an item on the horizontal axis, such as, for example, creation date and time of each piece of control information or a sequence number associated with each piece of generation information.

[3-4-1-2. Flow of Processes]

Next, referring to FIG. 13, an example of a flow of display control on the monitor terminal 22 according to the application example 1 will be described. It is to be noted that the flow of the display control may be executed in parallel with the flow of processes illustrated in FIGS. 7 to 9.

As illustrated in FIG. 13, first, the monitor section 110 confirms whether or not the number of components in the FIFO queue 102 (i.e., the number of pieces of control information) has changed (S201). In a case where the number of components in the FIFO queue 102 has not changed (S201: No), the display controller 112 performs a process of S211, which will be described later.

Alternatively, in a case where the number of components in the FIFO queue 102 has decreased (S201: Yes, S203: Yes), the display controller 112 deletes display information corresponding to control information whose order in the FIFO queue 102 is the first in the graph indicating the amount of data for each piece of control information currently being displayed on the monitor terminal 22, for example, as illustrated in FIG. 10 (S205). Thereafter, the display controller 112 performs a process of S211, which will be described later.

Alternatively, in a case where the number of components in the FIFO queue 102 has increased (S201: Yes, S203: No), the monitor section 110 first specifies an amount of data in a buffer area 108 associated with control information newly added to the FIFO queue 102 (S207). The display controller 112 then adds display information corresponding to the added control information indicating the amount of data specified in S207, in the graph currently being displayed on the monitor terminal 22 (S209).

Thereafter, the display controller 112 updates the display such that the display indicating the amount of data in each buffer area 108 included in the graph indicates the current amount of data (S211). The server 10 then repeats processes of S201 to S211 until, for example, the server 10 stops.

[3-4-1-3. Effects]

As described above, according to application example 1, a supervisor is able to understand at a glance the relationship between each individual piece of control information stored in the FIFO queue 102 and the amount of data in each buffer area 108 by viewing the graph indicating the amount of data for each piece of control information displayed on the monitor terminal 22. As a result, the supervisor is able to discover erroneous data early. In addition, the supervisor able to promptly and appropriately perform exceptional operations with respect to the process of each individual piece of partial data having received from the user terminal 30, depending on the situations. For example, the supervisor is able to exceptionally change by a hand of a human the order relationship of each individual piece of control information stored in the FIFO queue 102, or to force a process being performed by processing server 20 to be interrupted.

3-4-2. Application Example 2

[3-4-2-1. Display Controller 112]

The application example 1 has been described above. Next, an application example 2 according to the first embodiment will be described. The display controller 112 according to the application example 2 causes the monitor terminal 22 to display a graph indicating a first relationship between each of one or more pieces of control information being stored in the FIFO queue 102 and an amount of data in a buffer area 108 associated with the control information, and a second relationship between each of one or more pieces of control information retrieved from the FIFO queue 102 and an amount of data associated with the control information, the graph indicating the first relationship as distinguished from the second relationship. Hereinafter, the first relationship is referred to as "the amount of data for each piece of control information in a waiting state" and the second relationship is referred to as "the amount of data for each piece of control information during processing".

FIG. 14 is a diagram illustrating an example of a graph (graph 62) according to the application example 2 in which "the amount of data for each piece of control information in the waiting state" is distinguished from "the amount of data for each piece of control information during processing". As illustrated in FIG. 14, in the graph 62, a histogram 620 indicating "the amount of data for each piece of control information during processing" is placed from the middle of the graph 62 to the left, and a histogram 622 indicating "the amount of data for each piece of control information in the waiting state" is arranged from the center of the graph 62 to the right. However, the positional relationship between the histogram 620 and the histogram 622 is not limited thereto, and may be reversed. Alternatively, although the graph 62 is divided into the left and the right to display "the amount of data for each piece of control information in the waiting state" and "the amount of data for each piece of control information during processing", the example is not limited thereto, and the graph 62 may also be divided into the top and the bottom to display "the amount of data for each piece of control information in the waiting state" and "the amount of data for each piece of control information during processing".

[3-4-2-2. Flow of Processes]

Next, referring to FIG. 15, an example of a flow of display control according to the application example 2 will be described. It is to be noted that the flow of the display control may be executed in parallel with the flow of processes illustrated in FIGS. 7 to 9.

As illustrated in FIG. 15, first, the monitor section 110 confirms whether or not the number of components in the FIFO queue 102 (i.e., the number of pieces of control information) has changed (S301). In a case where the number of components in the FIFO queue 102 has not changed (S301: No), the display controller 112 performs a process of S311, which will be described later.

Alternatively, in a case where the number of components in the FIFO queue 102 has decreased (S301: Yes, S303: Yes), the display controller 112 shifts the display position of each histogram in the "graph indicating the amount of data for each piece of control information in the waiting state as distinguished from the amount of data for each piece of control information during processing" which is currently being displayed on the monitor terminal 22, for example, as illustrated in FIG. 14, leftward by one scale on the horizontal axis (S305). Thereafter, display controller 112 performs a process of S311, which will be described later.

Alternatively, in a case where the number of components in the FIFO queue 102 has increased (S301: Yes, S303: No), the monitor section 110 first specifies an amount of data in a buffer area 108 associated with control information newly added to the FIFO queue 102 (S307). The display controller 112 then adds display information corresponding to the added control information indicating the amount of data specified in S307, in the graph currently being displayed on the monitor terminal 22 (S309).

Thereafter, the display controller 112 updates the display such that the display indicating the amount of data in each buffer area 108 included in the graph indicates the current amount of data (S311). The server 10 then repeats processes of S301 to S311 until, for example, the server 10 stops.

4. Second Embodiment

[4-1. FIFO Queue 102]

The first embodiment has been described above. Next, a second embodiment according to the present disclosure will be described. The server 10 according to the second embodiment differs, as compared to the first embodiment, in that the server 10 has a plurality of FIFO queues 102 as illustrated in FIG. 16, for example. In addition, each individual FIFO queue 102 has a different degree of priority for a process to be performed by the processing server 20.

[4-2. Display Controller 112]

The display controller 112 according to the second embodiment is able to cause the monitor terminal 22 to display a monitor screen as illustrated in FIG. 17, for example, the monitor screen indicating a storage state of each individual piece of control information in each individual FIFO queue 102.

FIG. 17 is a diagram illustrating a display example (monitor screen 70) of the monitor screen. The example illustrated in FIG. 17 indicates a state in which four pieces of control information are stored in a FIFO queue 102a whose degree of priority is "1" and one piece of control information is stored in a FIFO queue 102b whose degree of priority is "10".

The monitoring screen 70 may further accept a user's operation for moving control information stored in one FIFO queue 102 into another FIFO queue 102. As indicated by a broken line arrow in FIG. 17, for example, it is assumed that a supervisor performs an operation for moving control information 1020a in the FIFO queue 102a having a degree of priority of "1" to a FIFO queue 102c having a degree of priority of "100", with respect to an input unit of the monitor terminal 22. In this case, the monitor terminal 22 transmits instruction information corresponding to the operation to the server 10. Then, the operation section 114 of the server 10 first retrieves the control information 1020a in the FIFO queue 102a whose degree of priority is "1" from the FIFO queue 102a on the basis of the instruction information. Thereafter, the operation section 114 adds the control information 1020a to a designated position in the FIFO queue 102c whose degree of priority is "100" on the basis of the instruction information.

Thus, according to the second embodiment, the supervisor is able to change of the storage position of the control information between the FIFO queues 102 whose degrees of priority differ from each other.

5. Hardware Configuration

Next, an example of a hardware configuration of the server 10 common to each embodiment will be described with reference to FIG. 18. As illustrated in FIG. 18, the server 10 includes a CPU 150, a ROM (Read Only Memory) 152, a RAM (Random Access Memory) 154, a bus 156, an interface 158, a storage device 160, and a communication device 162.

The CPU 150 functions as an arithmetic processing device and a control device to control the overall operation of the server 10 in accordance with various programs. In addition, the CPU 150 realizes a function of the controller 100, for example, in the server 10. The CPU 150 includes a processor such as a microprocessor.

The ROM 152 stores control data such as programs and operation parameters to be used by the CPU 150.

The RAM 154 temporarily stores, for example, programs executed by the CPU 150 or data being used.

The bus 156 includes a CPU bus, and the like. The bus 156 mutually couples the CPU 150, the ROM 152, and the RAM 154.

The interface 158 couples the storage device 160 and the communication device 162 to the bus 156.

The storage device 160 is a device for storing data that functions as the FIFO queue 102 and the entire buffer area 106, for example. The storage device 160 includes, for example, a storage medium, a storage device for recording data on a storage medium, a reading device for reading data from a storage medium, or a deletion device for deleting data recorded on a storage medium.

The communication device 162 may be a communication interface including a communication device (e.g., a network card) to be coupled to the communication network 24 or the like, for example. Further, the communication device 162 may be a wireless LAN-enabled communication device, an LTE (Long Term Evolution)-enabled communication device, or a wired communication device. The communication device 162 functions as the communication section 120.

6. Modification Example

A preferred embodiment(s) of the present disclosure has/have been described above in detail with reference to the accompanying drawings, but the technical scope of the present disclosure is not limited to such an embodiment(s). It is apparent that a person having ordinary skill in the art of the present disclosure can arrive at various alterations and modifications within the scope of the technical idea described in the appended claims, and it is understood that such alterations and modifications naturally fall within the technical scope of the present disclosure.

For example, one or more of the FIFO queue 102, the buffer manager 104, the entire buffer area 106, the monitor section 110, the display controller 112, and the operation section 114 may be included in one or more other devices coupled to the communication network 24, for example, instead of being included in the server 10. In this case, the functions of the server 10 according to the above-described embodiments may be achieved by the server 10 and the one or more other devices operating in a cooperative manner.

As another modification example, only one server 10 is illustrated in FIG. 1, but is not limited to such an example. The functions of the server 10 according to the above-described embodiments may be achieved by a plurality of computers operating in a cooperative manner.

As another modification example, the information processing device according to the present disclosure is not limited to the server 10. For example, the information processing device may be another type of device having each components included in the above-described server 10. By way of example, the information processing device may be a general-purpose PC (Personal Computer), a tablet-type terminal, a gaming machine, a mobile phone such as a smart phone, a portable music player, a speaker, a projector, a wearable device such as an HMD (Head Mounted Display) or a smart watch, an in-vehicle device (such as a car navigation device), or a robot (such as a humanoid robot, an autonomous car, a drone, etc.).

Further, each step in the flow of processes according to each embodiment described above does not necessarily have to be processed in the order described. For example, the order of the steps may be changed as appropriate. Also, the steps may be processed partially in parallel or individually instead of being processed in time series. Also, some of the described steps may be omitted or other steps may be further added.

In addition, according to the above-described embodiments, a computer program is providable for enabling hardware, such as the CPU 150, the ROM 152, and the RAM 154, to exhibit functions corresponding to the components of the server 10 according to each embodiment. Further, a storage medium in which the computer program is recorded is also provided.

Furthermore, the effects described herein are merely illustrative and exemplary, and not limiting. That is, the technique according to the present disclosure can exert other effects that are apparent to those skilled in the art from the description herein, in addition to the above-described effects or in place of the above-described effects.

It is to be noted that the present disclosure may have the following configurations.

(1)

An information processing device including:

a receiver that receives a plurality of pieces of control information from another device; and a controller that adds, in order of reception, a plurality of pieces of control information received from another device to a predetermined storage area, and adds, to a first buffer area related to first control information stored in the predetermined storage area, partial data of first input data corresponding to the first control information, in accordance with order of reception of the partial data.

(2)

The information processing device according to (1), in which pieces of control information including the first control information stored in the predetermined storage area are respectively related to buffer areas different from each other out of a plurality of buffer areas including the first buffer area.

(3)

The information processing device according to (2), in which the controller further adds, to a second buffer area related to second control information stored in the predetermined storage area, partial data of second input data corresponding to the second control information, in accordance with order of reception of the partial data of the second input data.

(4)

The information processing device according to (2) or (3), in which, out of a plurality of pieces of control information stored in the predetermined storage area, a piece of control information whose order of storage is earlier is retrieved earlier from the predetermined storage area.

(5)

The information processing device according to (4), in which, out of one or more pieces of partial data of input data corresponding to control information, the one or more pieces of partial data being stored in each of the plurality of buffer areas, the control information being related to the buffer area, partial data whose order of storage is earlier is retrieved earlier from the buffer area.

(6)

The information processing device according to (5), in which, every time first operation information for issuing an instruction to output control information is received from a processing device that processes the input data corresponding to the control information, the controller retrieves, from the predetermined storage area, control information whose order of storage is first out of the plurality of pieces of control information stored in the predetermined storage area, and causes a transmitter to transmit the retrieved control information to the processing device.

(7)

The information processing device according to (6), in which, every time second operation information for issuing an instruction to output the partial data is received from the processing device, the controller retrieves, from the first buffer area, the partial data whose order of storage is first within the first buffer area, and causes the transmitter to transmit the retrieved partial data to the processing device.

(8)

The information processing device according to (7), in which, every time the second operation information is received from the processing device, the controller specifies the first buffer area out of the plurality of buffer areas on a basis of the second operation information to retrieve one piece of the partial data from the first buffer area.

(9)

The information processing device according to any one of (5) to (8), further including a display controller that causes a display screen to display an image that indicates a relationship between each of a plurality of pieces of control information received from another device and an amount of data stored in a buffer area related to the control information.

(10)

The information processing device according to (9) in which, every time control information is received from another device and every time partial data of input data corresponding to the control information is received from another device, the display controller causes the display screen to display an image that indicates the relationship which has been changed in accordance with the reception.

(11)

The information processing device according to (10), in which, every time any one of the plurality of pieces of control information stored in the predetermined storage area is retrieved from the predetermined storage area and the retrieved control information is transmitted to a processing device that processes input data corresponding to the control information, the display controller causes the display screen to display an image that indicates the relationship which has been changed in accordance with the transmission.

(12)

The information processing device according to any one of (9) to (11), in which the display controller causes the display screen to display an image that indicates a first relationship between each of the plurality of pieces of control information being stored in the predetermined storage area and an amount of data stored in a buffer area related to the control information, and a second relationship between each of one or more pieces of control information that have been retrieved from the predetermined storage area and have been transmitted to a processing device and an amount of data stored in a buffer area related to the control information, the image indicating the first relationship as distinguished from the second relationship.

(13)

The information processing device according to any one of (9) to (12), in which a plurality of the predetermined storage areas respectively have values that are different from each other, each value being set as a degree of priority related to one or more pieces of control information stored in a relevant one of the predetermined storage areas.

(14)

The information processing device according to (13), in which the plurality of predetermined storage area includes a first storage area and a second storage area, and the controller retrieves third control information from the first storage area and adds the third control information to the second storage area, on a basis of an instruction from a user to move the third control information stored in the first storage area to the second storage area.

(15)

The information processing device according to any one of (9) to (14), in which the first input data is data to be processed that the first control information designates.

(16)

The information processing device according to (15), in which the first input data is stream data, and partial data of the first input data is data corresponding to one block of the stream data.

(17)

The information processing device according to (15) or (16), further including:

the predetermined storage area; and the plurality of buffer areas.

(18)

The information processing device according to (17), further including a buffer manager that, in a case where fourth control information that is not related to any buffer area is received from another device, generates a new buffer area in a storage section including the plurality of buffer areas, and associates the generated buffer area with the fourth control information.

(19)

An information processing method including:

receiving a plurality of pieces of control information from another device; and adding in order of reception, by a processor, a plurality of pieces of control information received from another device to a predetermined storage area, and adds, to a first buffer area related to first control information stored in the predetermined storage area, partial data of first input data corresponding to the first control information, in accordance with order of reception of the partial data.

(20)

A program for causing a computer to function as a receiver that receives a plurality of pieces of control information from another device, and a controller that adds, in order of reception, a plurality of pieces of control information received from another device to a predetermined storage area, and adds, to a first buffer area related to first control information stored in the predetermined storage area, partial data of first input data corresponding to the first control information, in accordance with order of reception of the partial data.

REFERENCE SIGNS LIST

10 server
20 processing server
22 monitor terminal
24 communication network
30 user terminal
100 controller 102 FIFO queue
104 buffer manager
106 entire buffer area
108 buffer area
110 monitor section
112 display controller
114 operation section
120 communication section

The invention claimed is:

1. An information processing device, comprising:
a receiver configured to receive a plurality of pieces of control information from a specific device; and
a controller configured to:
control addition, in order of reception, of the plurality of pieces of control information received from the specific device to a specific storage area,
control addition, to a first buffer area related to first control information stored in the specific storage area, of partial data of first input data corresponding to the first control information, based on order of reception of the partial data, wherein
the plurality of pieces of control information, including the first control information stored in the specific storage area, is respectively related to a plurality of buffer areas,
the plurality of buffer areas are different from each other,
the plurality of buffer areas includes the first buffer area,
a piece of control information, of the plurality of pieces of control information, whose order of storage is earlier is retrieved earlier from the specific storage area, and
out of a plurality of pieces of partial data of input data corresponding to the first control information, the plurality of pieces of partial data being stored in each of the plurality of buffer areas, a piece of partial data of the plurality of pieces of partial data whose order of storage is earlier is retrieved earlier from the first buffer area, and
a display controller configured to control a display screen to display an image that indicates a relationship between each of the plurality of pieces of control information received from the specific device and an amount of data stored in the first buffer area related to the first control information.

2. The information processing device according to claim 1, wherein the controller is further configured to control addition, to a second buffer area related to second control information stored in the specific storage area, of partial data of second input data corresponding to the second control information, based on order of reception of the partial data of the second input data.

3. The information processing device according to claim 1, wherein
the display controller is further configured to control the display screen to display an image that indicates
a first relationship between each of the plurality of pieces of control information being stored in the specific storage area and an amount of data stored in a buffer area related to the control information, and
a second relationship between each of the plurality of pieces of control information, that have been retrieved from the specific storage area and have been transmitted to a processing device, and an amount of data stored in a buffer area related to the control information, and the image indicates the first relationship as distinguished from the second relationship.

4. The information processing device according to claim 1, wherein the controller is further configured to:
receive first operation information, for issuing an instruction to output the control information, from a processing device that processes the input data corresponding to the control information,
retrieve, from the specific storage area, the control information whose order of storage is first out of the plurality of pieces of control information stored in the specific storage area, and
transmit the retrieved control information to the processing device.

5. The information processing device according to claim 4, wherein the controller is further configured to:
receive second operation information, for issuing an instruction to output the partial data, from the processing device,
retrieve, from the first buffer area, the partial data whose order of storage is first within the first buffer area, and
transmit the retrieved partial data to the processing device.

6. The information processing device according to claim 5, wherein the controller is further configured to:
receive the second operation information from the processing device, and
specify the first buffer area out of the plurality of buffer areas based on the second operation information to retrieve one piece of the partial data from the first buffer area.

7. The information processing device according to claim 1 wherein based on reception of the control information and the partial data of the input data corresponding to the control information from the specific device, the display controller is further configured to control the display screen to display an image that indicates the relationship which has been changed based on the reception.

8. The information processing device according to claim 7, wherein based on retrieval of any one of the plurality of pieces of control information stored in the specific storage area and transmission of the retrieved control information to a processing device that processes the input data corresponding to the control information, the display controller is further configured to control the display screen to display an image that indicates the relationship which has been changed based on the transmission.

9. The information processing device according to claim 1, wherein a plurality of the specific storage areas respectively have values that are different from each other, each value being set as a degree of priority related to the plurality of pieces of control information stored in a relevant one of the specific storage areas.

10. The information processing device according to claim 9, wherein
the plurality of the specific storage areas includes a first storage area and a second storage area, and
the controller is further configured to:
retrieve third control information from the first storage area, and
add the third control information to the second storage area, based on an instruction from a user to move the third control information stored in the first storage area to the second storage area.

11. The information processing device according to claim 1, wherein the first input data is data to be processed that the first control information designates.

12. The information processing device according to claim 11, wherein the first input data is stream data, and the partial data of the first input data is data corresponding to one block of the stream data.

13. The information processing device according to claim 11, further comprising:
the specific storage area; and
the plurality of buffer areas.

14. The information processing device according to claim 13, further comprising a buffer manager configured to:
generate, based on fourth control information not related to any buffer area is received from the specific device, a new buffer area in a storage section including the plurality of buffer areas, and
associate the generated new buffer area with the fourth control information.

15. An information processing method, comprising:
receiving a plurality of pieces of control information from a specific device;
control addition, in order of reception of the plurality of pieces of control information received from the specific device to a specific storage area;
control addition, to a first buffer area related to first control information stored in the specific storage area, of partial data of first input data corresponding to the first control information, based on order of reception of the partial data, wherein
the plurality of pieces of control information, including the first control information stored in the specific storage area, is respectively related to a plurality of buffer areas,
the plurality of buffer areas are different from each other,
the plurality of buffer area includes the first buffer area,
a piece of control information, of the plurality of pieces of control information, whose order of storage is earlier is retrieved earlier from the specific storage area, and
out of a plurality of pieces of partial data of input data corresponding to the first control information, the plurality of pieces of partial data being stored in each of the plurality of buffer areas, a piece of partial data of the plurality of pieces of partial data whose order of storage is earlier is retrieved earlier from the first buffer area; and
controlling a display screen to display an image that indicates a relationship between each of the plurality of pieces of control information received from the specific device and an amount of data stored in the first buffer area related to the first control information.

16. A non-transitory computer-readable medium having stored thereon computer-executable instructions that, when executed by a processor, cause the processor to execute operations, the operations comprising:
receiving a plurality of pieces of control information from a specific device;
controlling addition, in order of reception, of the plurality of pieces of control information received from the specific device to a specific storage area;
controlling addition, to a first buffer area related to first control information stored in the specific storage area, of partial data of first input data corresponding to the first control information, based on order of reception of the partial data, wherein
the plurality of pieces of control information, including the first control information stored in the specific storage area, is respectively related to a plurality of buffer areas,
the plurality of buffer areas are different from each other,
the plurality of buffer areas includes the first buffer area,
a piece of control information, of the plurality of pieces of control information, whose order of storage is earlier is retrieved earlier from the specific storage area, and
out of a plurality of pieces of partial data of input data corresponding to the first control information, the plurality of pieces of partial data being stored in each of the plurality of buffer areas, a piece of partial data of the plurality of pieces of partial data whose order of storage is earlier is retrieved earlier from the first buffer area; and
controlling a display screen to display an image that indicates a relationship between each of the plurality of pieces of control information received from the specific device and an amount of data stored in the first buffer area related to the first control information.

* * * * *